(12) United States Patent
Ono

(10) Patent No.: US 9,421,846 B2
(45) Date of Patent: Aug. 23, 2016

(54) VEHICLE CONTROL SYSTEM

(71) Applicant: DENSO CORPORATION, Kariya, Aichi-pref. (JP)

(72) Inventor: Hiroaki Ono, Tokoname (JP)

(73) Assignee: DENSO CORPORATION, Kariya (JP)

(*) Notice: Subject to any disclaimer, the term of this patent is extended or adjusted under 35 U.S.C. 154(b) by 11 days.

(21) Appl. No.: 14/631,191

(22) Filed: Feb. 25, 2015

(65) Prior Publication Data

US 2015/0246591 A1 Sep. 3, 2015

(30) Foreign Application Priority Data

Mar. 3, 2014 (JP) .................................. 2014-40826

(51) Int. Cl.
| | | |
|---|---|---|
| F28F 27/02 | (2006.01) | |
| B60W 20/00 | (2006.01) | |
| B60H 1/00 | (2006.01) | |
| B60W 10/06 | (2006.01) | |
| B60W 10/26 | (2006.01) | |
| B60W 10/30 | (2006.01) | |
| B60H 1/14 | (2006.01) | |

(52) U.S. Cl.
CPC .............. *B60H 1/004* (2013.01); *B60H 1/143* (2013.01); *B60W 10/06* (2013.01); *B60W 10/26* (2013.01); *B60W 10/30* (2013.01); *B60W 20/13* (2016.01); *B60W 20/15* (2016.01); *Y10S 903/93* (2013.01)

(58) Field of Classification Search
CPC ..... B60W 20/00; B60W 10/06; B60H 1/004; B60H 1/00278; B60H 1/00057; B60K 35/00; F28F 27/02; F01N 3/043; B60G 3/20
USPC ...................... 701/22, 102; 180/65.21, 65.51; 700/275; 62/259.2; 165/103; 60/320
See application file for complete search history.

(56) References Cited

U.S. PATENT DOCUMENTS

| | | | | |
|---|---|---|---|---|
| 2003/0230443 A1* | 12/2003 | Cramer | ..................... | B60G 3/20 180/65.51 |
| 2006/0080986 A1* | 4/2006 | Inoue | ................. | B60H 1/00057 62/259.2 |
| 2007/0265762 A1* | 11/2007 | Suzuki | ................... | B60H 1/004 701/102 |
| 2009/0248204 A1* | 10/2009 | Kikuchi | ............. | B60H 1/00278 700/275 |
| 2009/0260903 A1* | 10/2009 | Park | ....................... | B60W 10/06 180/65.21 |
| 2011/0046832 A1* | 2/2011 | Francoeur | .............. | B60K 35/00 701/22 |
| 2011/0289905 A1* | 12/2011 | Acre | ....................... | F01N 3/043 60/320 |
| 2013/0112371 A1* | 5/2013 | Koo | ........................ | F28F 27/02 165/103 |

FOREIGN PATENT DOCUMENTS

JP 2013018420 A * 1/2013 ............ B60W 20/00

* cited by examiner

*Primary Examiner* — Yuri Kan
(74) *Attorney, Agent, or Firm* — Nixon & Vanderhye PC

(57) ABSTRACT

When there is a demand for a heating operation of a vehicle and when there is a remaining charging capacity in a main battery, an upper limit value of a charging state of the battery is changed to a level-up upper-limit value, which higher than an ordinary upper-limit value. And an operating mode of an engine is changed to an efficiency prioritizing mode. When there is no remaining charging capacity in the main battery, the upper limit value of the charging state is changed to the ordinary upper-limit value. And the operating mode of the engine is changed to a waste-heat prioritizing mode, an engine efficiency of which is lower than that of the efficiency prioritizing mode. According to such a control, it becomes possible to warm up the engine and the battery, even in the case that there is no remaining charging capacity because of high charging state in the battery.

9 Claims, 13 Drawing Sheets

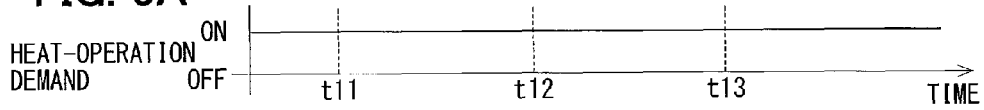
FIG. 5A HEAT-OPERATION DEMAND
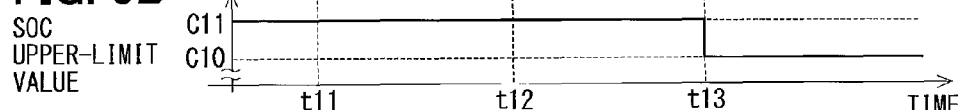
FIG. 5B SOC UPPER-LIMIT VALUE
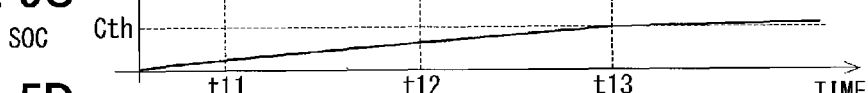
FIG. 5C SOC
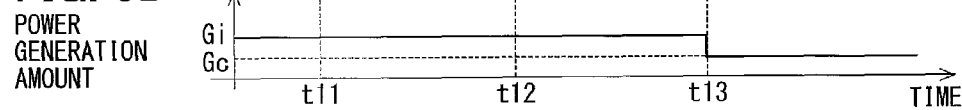
FIG. 5D POWER GENERATION AMOUNT
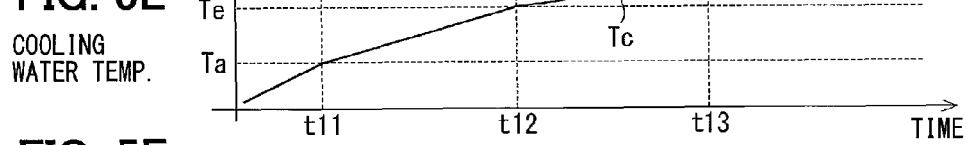
FIG. 5E COOLING WATER TEMP.
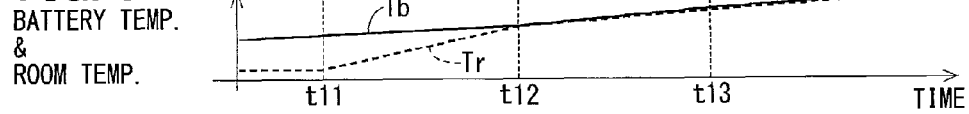
FIG. 5F BATTERY TEMP. & ROOM TEMP.
FIG. 5G MG OPERATING MODE
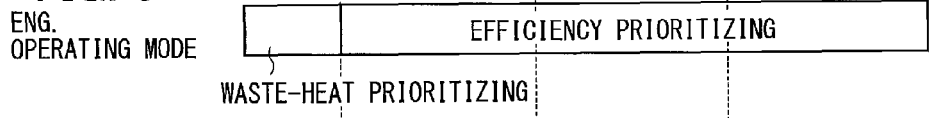
FIG. 5H ENG. OPERATING MODE
FIG. 5I A/C BLOWER
FIG. 5J BATTERY BLOWER

VEHICLE CONTROL SYSTEM

CROSS REFERENCE TO RELATED APPLICATION

This application is based on Japanese Patent Application No. 2014-040826 filed on Mar. 3, 2014, the disclosure of which is incorporated herein by reference.

FIELD OF TECHNOLOGY

The present disclosure relates to a vehicle control system.

BACKGROUND

A heating system by use of a heater core for a hybrid vehicle is known in the art, according to which heat exchange is carried out between engine cooling water and air to be blown into a passenger compartment of the vehicle. For example, as disclosed in Japanese Patent Publication No. 2006-152827, when an engine operation is turned on in order to carry out an air-conditioning operation, an engine is operated in a load operating mode in which a battery charging operation is also carried out. The above prior art aims at improving a fuel consumption ratio by the above engine operation.

In the vehicle control system of the above prior art, the engine is operated in the load operating mode, wherein a predetermined SOC (State Of Charge) value higher than an ordinary upper limit value of the SOC is set as an upper limit SOC value for the load operating mode in order that excess amount of generated electric power is charged in a battery as much as possible. In the load operating mode, a warm-up operation is also carried out for the engine as well as the battery. However, in a case that the SOC value is high, the amount of the generated electric power to be charged into the battery is limited. As a result, it is not always possible to carry out the engine operation of the load operating mode in which the battery charging operation is also carried out.

SUMMARY OF THE DISCLOSURE

The present disclosure is made in view of the above problem. It is an object of the present disclosure to provide a vehicle control system, according to which a warm-up operation for an engine as well as a battery can be carried out, even in a case that an SOC (State Of Charge) value of a battery is high.

According to a feature of the present disclosure, a vehicle control apparatus controls a hybrid vehicle, which has an engine, a motor-generator, an electric-power charging device and a heating system. The motor-generator generates electric power when it is driven to rotate by the engine. The electric-power charging device, which is capable of charging and discharging the electric power, exchanges the electric power with the motor generator. The heating system is operated by use of waste heat of the engine.

The vehicle control apparatus has a heating demand determining portion, a charging capacity determining portion, an upper-limit value setting portion, and an engine-mode setting portion.

The heating demand determining portion determines whether there is a demand for a heating operation of a vehicle compartment. The charging capacity determining portion determines whether there is a remaining charging capacity for the electric-power charging device, based on a charging state of the electric-power charging device. The upper-limit value setting portion sets an upper limit value of the charging state of the electric-power charging device, depending on an existence-nonexistence of the remaining charging capacity of the electric-power charging device. And the engine-mode setting portion sets an operating mode of the engine.

When there is the demand for the heating operation of the vehicle compartment and there is the remaining charging capacity for the electric-power charging device, (i) the upper-limit value setting portion sets the upper limit value of the charging state at a level-up upper-limit value, which is larger than an ordinary upper-limit value, and (ii) the engine-mode setting portion changes the operating mode of the engine to an engine-efficiency prioritizing mode.

When there is the demand for the heating operation of the vehicle compartment and there is no remaining charging capacity for the electric-power charging device, (iii) the upper-limit value setting portion sets the upper limit value of the charging state at the ordinary upper-limit value, and (iv) the engine-mode setting portion changes the operating mode of the engine to a waste-heat prioritizing mode, wherein an engine efficiency of the waste-heat prioritizing mode is lower than that of the engine-efficiency prioritizing mode.

According to the present disclosure, when there is the remaining charging capacity in the electric-power charging device, the upper limit value of the charging state is changed to the level-up upper-limit value so that an operating mode of the motor-generator is changed to a level-up power generation mode in order to increase electric power amount generated by the motor-generator. According to the above control, an operating point of the engine is shifted to a high-load side. As a result, not only efficiency of the engine is improved but also a temperature increasing speed of engine cooling water is increased. In addition, since electric power amount to be charged into the electric-power charging device is increased in accordance with an increase of the electric power amount generated by the motor-generator, it becomes possible to effectively increase temperature of the electric-power charging device by power-charging heat.

On the other hand, when there is no remaining charging capacity in the electric-power charging device, it is not possible to increase the electric power amount to be charged into the electric-power charging device. It takes a longer time period to increase the temperature of the engine cooling water and the electric-power charging device. According to the present disclosure, therefore, the operating mode of the engine is changed to the waste-heat prioritizing mode, when there is no remaining charging capacity in the electric-power charging device. Then, thermal amount to be supplied to the engine cooling water is increased to facilitate the temperature increase of the engine cooling water. When the temperature of the engine cooling water is increased, a temperature increase for the vehicle compartment by the heating system is facilitated. In addition, when the temperature of the vehicle compartment is increased, it becomes possible to increase the temperature of the electric-power charging device by air, for example, from a battery blower device.

As above, even in the case that there is no remaining charging capacity in the electric-power charging device, it is possible to warm up not only the engine but also the electric-power charging device.

BRIEF DESCRIPTION OF THE DRAWINGS

The above and other objects, features and advantages of the present disclosure will become more apparent from the following detailed description made with reference to the accompanying drawings. In the drawings:

FIGS. 5A to 5J are time-charts for explaining the control process of the warm-up operation of the first embodiment;

DETAILED DESCRIPTION OF THE EMBODIMENTS

Figure 1:
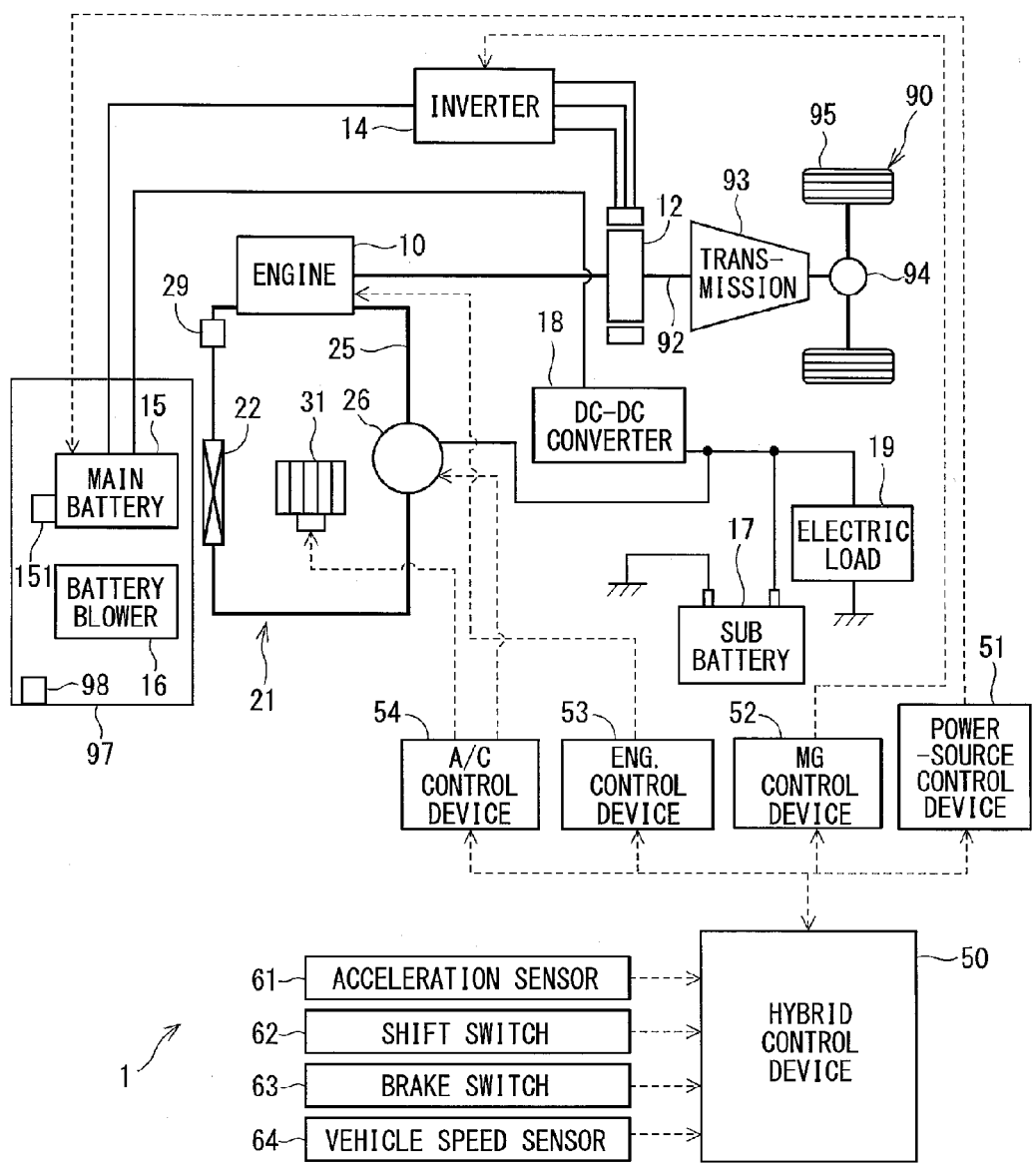
FIG. 1 is a diagram showing an outline of a structure of a vehicle control system according to a first embodiment of the present disclosure.

The present disclosure will be explained hereinafter by way of multiple embodiments with reference to the drawings. The same reference numerals are given to the same or similar structure and/or portion in order to avoid repeated explanation.

First Embodiment

A vehicle control system 1 is shown in FIG. 1, to which a vehicle control apparatus according to a first embodiment of the present disclosure is applied. The vehicle control system 1 is composed of an internal combustion engine 10 (hereinafter, the engine 10), a motor-generator 12, a main battery 15 as an electric-power charging device, a heating system 21 utilizing waste-heat of the engine 10, a hybrid control device 50 and so on. Hereinafter, the motor-generator 12 is also referred to the MG 12.

The engine 10 having multiple cylinders forms a power driving source for a vehicle 90 together with the MG 12. In the present embodiment, the vehicle 90 is a hybrid vehicle, which runs by driving force produced at the engine 10 as well as driving force generated at the MG 12.

The MG 12 has a first function as an electric motor for generating rotational torque when the electric power is supplied thereto from the main battery 15 and a second function as an electric power generating device for generating electric power when it is driven to rotate by the engine 10 or when it is driven to rotate during a vehicle braking operation of the vehicle 90. The MG 12 is a three-phase alternating current electric machine having permanent magnets of a synchronous type.

The driving force of the engine 10 as well as the driving force of the MG 12 is transmitted to a transmission apparatus 93 via a drive shaft 92. The driving force is further transmitted to driving wheels 95 of the vehicle 90 via a differential gear 94. The transmission apparatus 93 of the present embodiment is, for example, a continuously variable transmission apparatus.

An inverter 14 is provided between the MG 12 and the main battery 15 for converting the electric power of the main battery 15 into alternating-current power (AC electric power) and supplying the AC electric power to the MG 12. In addition, the inverter 14 converts the AC electric power generated by the MG 12 into direct current power (DC electric power) and charges the DC electric power into the main battery 15.

The main battery 15 is composed of, for example, a nickel-hydrogen secondary battery, a lithium-ion secondary battery or the like, which is capable of charging and discharging the electric power. The main battery 15 is so controlled that a charging state (the SOC=State Of Charge) thereof falls within a predetermined range. In the present embodiment, the SOC corresponds to "a charging state of the main battery 15".

The electric power is exchanged between the main battery 15 and the MG 12. More exactly, the AC electric power generated at the MG 12 is converted into the DC electric power and such DC electric power is charged into the main battery 15. On the other hand, the DC electric power of the main battery 15 is converted into the AC electric power and supplied to the MG 12.

In the present embodiment, the main battery 15 is provided in a vehicle compartment 97. A battery temperature sensor 151 is provided in the main battery 15 in order to detect temperature of the main battery 15 (hereinafter, the battery temperature "Tb").

A battery blower device 16 is provided in the vehicle compartment 97 for blowing air of the vehicle compartment 97 to the main battery 15.

A room temperature sensor 98 is provided in the vehicle compartment 97 in order to detect temperature of the vehicle compartment 97 (hereinafter, a room temperature "Tr").

A sub-battery 17 is a battery having an output voltage lower than that of the main battery 15. The sub-battery 17 is connected to the main battery 15 via a DC-DC converter 18, so that voltage of the electric power of the main battery 15 is decreased by the DC-DC converter 18 and such electric power of the decreased voltage is charged in the sub-battery 17. The electric power of the sub-battery 17 is supplied to various kinds of electric loads 19, the battery blower device 16, an electrically powered pump 26 (explained below), an electric motor of a blower device 31 (hereinafter, the A/C blower device 31) for an air-conditioning apparatus (hereinafter, the A/C apparatus) and so on, each of which is operated with the electric power of the lower voltage.

The heating system 21 is composed of a heater core 22, a cooling water circulation path 25, the electrically powered pump 26 and so on. The heater core 22 takes out heat from engine cooling water for the engine 10 and supplies the heat into the vehicle compartment 97. Namely, the A/C blower device 31 supplies heated air into the vehicle compartment 97 so as to carry out a heating operation for the vehicle 90.

In the present embodiment, the battery blower device 16 and the A/C blower device 31 are collectively referred to as "a blower device".

A water jacket is formed in a cylinder block and a cylinder head of the engine 10 so that the engine cooling water passes through the water jacket in order to cool down the engine 10. The cooling water circulation path 25 is connected to the water jacket. The electrically powered pump 26 is provided in the cooling water circulation path 25 so that the engine cooling water is circulated when the electric power is supplied from the sub-battery 17 to the electrically powered pump 26. A flow rate of the engine cooling water to be circulated in the cooling water circulation path 25 is controlled by changing a discharge amount of the electrically powered pump 26.

The cooling water circulation path 25 extends from a water outlet port of the engine 10 to the heater core 22 and returns to the engine 10 via the heater core 22. The air supplied from the A/C blower device 31 passes through the heater core 22, so that heat exchange is carried out between the air and the engine cooling water. The air is heated up and such hot air is supplied into the vehicle compartment 97 through air ducts (not shown) of the vehicle 90.

In the above structure of the heating system 21, the discharge amount of the electrically powered pump 26 and an operational condition of the A/C blower device 31 are controlled in order to control heat quantity to be supplied from the engine cooling water into the vehicle compartment 97 via the heater core 22.

A water temperature sensor 29 is provided in the cooling water circulation path 25 at a position close to the water outlet port of the engine 10. The water temperature sensor 29 detects temperature of the engine cooling water (hereinafter, cooling water temperature "Tc"), which passes through the cooling water circulation path 25 from the water outlet port of the engine 10 to the heater core 22.

The vehicle control system 1 is composed of the hybrid control device 50, a power-source control device 51, an MG control device 52, an engine control device 53, an A/C (air-conditioner) control device 54 and so on. Each of the control devices 51 to 54 is composed of a micro-computer including a CPU, a ROM, a RAM and so on. Each control device carries out its control by executing various kinds of control programs memorized in the ROM.

Various kinds of signals are inputted to the hybrid control device 50 from an acceleration sensor 61, a shift switch 62, a brake switch 63, a vehicle speed sensor 64, the water temperature sensor 29, the room temperature sensor 98, the battery temperature sensor 151 and so on. The hybrid control device 50 controls the vehicle 90 as a whole based on the above inputted information. In FIG. 1, electrical connection lines related to the water temperature sensor 29, the room temperature sensor 98 and the battery temperature sensor 151 are omitted for the sake of simplification.

The power-source control device 51 receives information for the charging state (the SOC) from the main battery 15 and monitors so as to control that the SOC value falls within a predetermined range.

The MG control device 52 controls operations of the MG 12 based on command signals from the hybrid control device 50.

The engine control device 53 controls an operation of the engine 10 based on the command signals from the hybrid control device 50. More exactly, the engine control device 53 carries out the following controls, which include a control of fuel injection by fuel injection devices, a control of ignition timing by an ignition device, a control of valve timing for intake and exhaust valves by a valve timing control device, a control of intake-air amount by a throttle valve device, and so on. Accordingly, the operation of the engine 10 is controlled.

The A/C control device 54 controls operations of the A/C blower device 31, the electrically powered pump 26 and so on based on the command signals from the hybrid control device 50.

When ambient temperature is low, for example, in a cold weather region, a battery performance cannot be sufficiently brought out, as the case may be, because the temperature of the main battery 15 is too low. In addition, a heating performance of the heating system 21 may not be sufficiently brought out, when the cooling water temperature "Tc" is low. According to the present embodiment, therefore, operational conditions of the engine 10 are so controlled as to make sure of the heating operation and to increase the temperature of the main battery 15.

A control process for the heating operation and the warm-up operation of the present embodiment will be explained based on flow-charts shown in FIGS. 2 and 3. The control process is repeatedly carried out by the hybrid control device 50 for predetermined intervals, when an ignition power source (not shown) is turned on.

At a step S101, the hybrid control device 50 (hereinafter, also referred to as a computer 50), determines whether there is a demand for the heating operation for the vehicle compartment 97. When there exists no such demand (NO at the step S101), the process goes to an end. When there is the demand for the heating operation (YES at the step S101), the process goes to a step S102.

At the step S102, the computer 50 calculates an engine power "Pe" outputted from the engine 10 based on the demand for the heating operation.

At a step S103, the computer 50 determines whether the SOC value is smaller than a level-up allowing threshold "Cth". The level-up allowing threshold "Cth" is set at such a value, which does not exceed an upper limit of the SOC value (hereinafter, an SOC upper-limit value) for the main battery 15 in consideration of surplus electric power and/or electric-power to be charged during a regenerative control.

When the computer 50 determines that the SOC value is equal to or larger than the level-up allowing threshold "Cth" (NO at the step S103), the computer 50 determines that there is no remaining capacity for charging the electric power (hereinafter, no remaining charging capacity) and the process goes to a step S110 of FIG. 3.

When the computer 50 determines that the SOC value is smaller than the level-up allowing threshold "Cth" (YES at the step S103), the computer determines that there is a remaining capacity for charging the electric power (hereinafter, the remaining charging capacitor) and the process goes to a step S104.

At the step S104, the computer 50 sets the SOC upper-limit value at such a value (a level-up upper-limit value "C11") which is higher than an ordinary upper-limit value "C10" of the SOC. When the SOC upper-limit value is increased as above, an amount of the electric power to be generated by the MG 12 can be increased. An operating mode of the MG 12 is referred to as a level-up power generation mode, in which the MG 12 is operated in a condition of the level-up upper-limit value "C11". In the present embodiment, the SOC upper-limit value corresponds to an upper limit for charging the electric power (hereinafter, a power-charge upper-limit value).

At a step S105, the computer 50 compares the room temperature "Tr" with the battery temperature "Tb" and determines whether the room temperature "Tr" is equal to or higher than the battery temperature "Tb". When the computer 50 determines that the room temperature "Tr" is equal to or higher than the battery temperature "Tb" (YES at the step S105), the process goes to a step S106. On the other hand, when the computer 50 determines that the room temperature "Tr" is lower than the battery temperature "Tb" (NO at the step S105), the process goes to a step S107.

At the step S106, the battery blower device 16 is turned on. At the step S107, the battery blower device 16 is turned off, because the battery temperature "Tb" may be decreased when the battery blower device 16 is turned on in the condition that the room temperature "Tr" is lower than the battery temperature "Tb".

At a step S108, which is executed after the step S106 or S107, the computer 50 determines whether the cooling water temperature "Tc" is higher than a threshold value "Te" for a completion of the engine warm-up operation (hereinafter, the warm-up threshold value "Te", which is, for example, 65° C.). When the computer determines that the cooling water temperature "Tc" is higher than the warm-up threshold value "Te" (YES at the step S108), the process goes to a step S116. On the other hand, when the computer determines that the cooling water temperature "Tc" is lower than (or equal to) the warm-up threshold value "Te" (NO at the step S108), the process goes to a step S109.

At the step S109, the computer further determines whether the cooling water temperature "Tc" is higher than a threshold value "Ta" for allowing the heating operation (hereinafter, the heating-operation threshold value "Ta", which is, for example, 30° C.). When the computer 50 determines that the cooling water temperature "Tc" is higher than the heating-operation threshold value "Ta" (YES at the step S109), the process goes to a step S118. On the other hand, when the computer 50 determines that the cooling water temperature "Tc" is lower than (or equal to) the heating-operation threshold value "Ta" (NO at the step S109), the process goes to a step S122 of FIG. 3. In the present embodiment, the heating-operation threshold value "Ta" corresponds not only to "the heating-operation threshold value" but also "a threshold value for changing a blower operation of the blower device (hereinafter, a blower-operation threshold value)".

Figure 3:
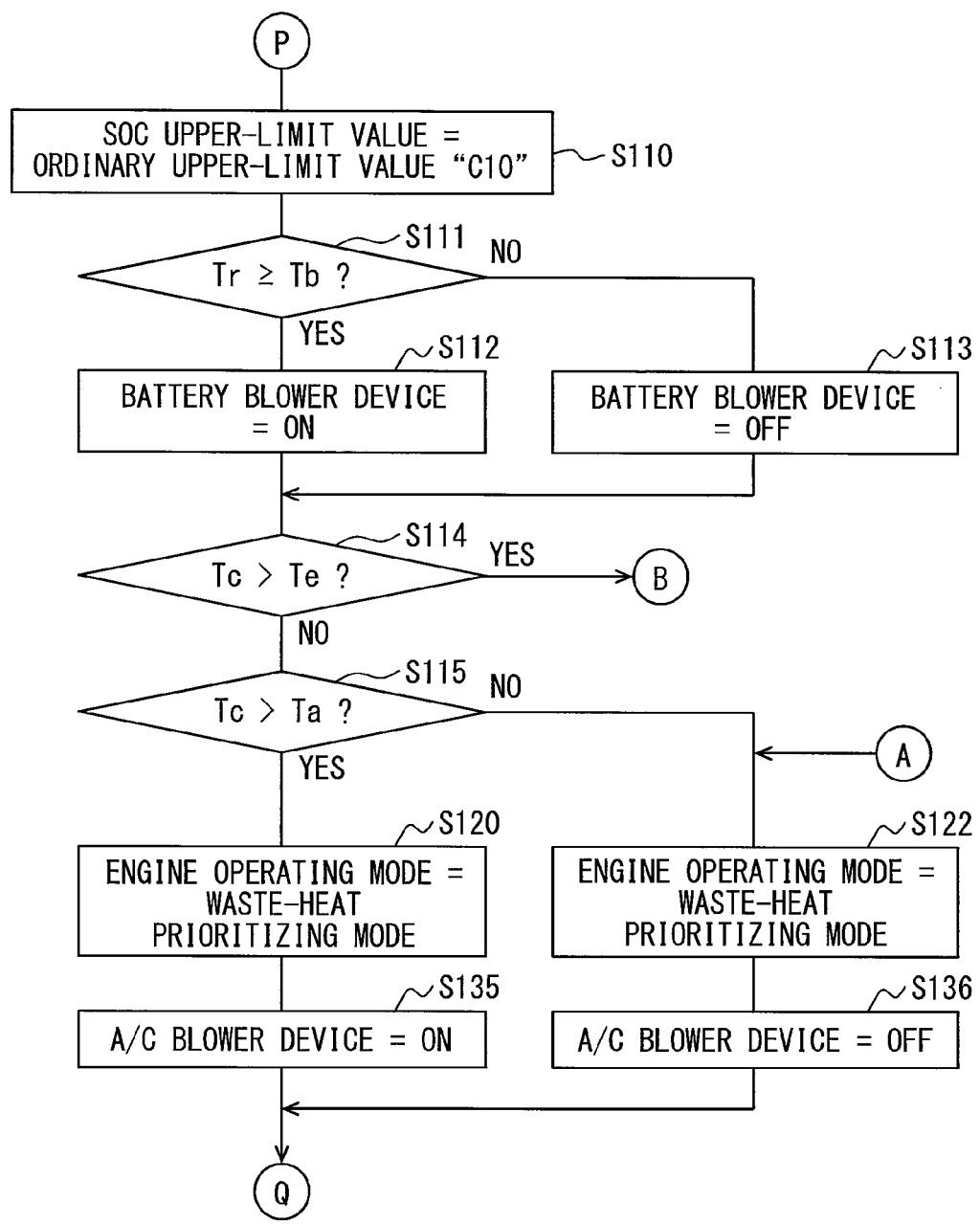
FIG. 3 is a remaining part of the flow-chart showing the control process of the warm-up operation.

As explained above, when the computer 50 determines that the SOC value is larger than (or equal to) the level-up allowing threshold "Cth" (NO at the step S103), the process goes to the step S110 of FIG. 3. At the step S110, the computer 50 sets the SOC upper-limit value at the ordinary upper-limit value "C10" of the SOC. As a result, the operating mode of the MG 12 is changed to an ordinary power generation mode, in which the MG 12 is operated in a condition of the ordinary upper-limit value "C10".

At a step S111, the computer 50 determines whether the room temperature "Tr" is equal to or higher than the battery temperature "Tb". When the computer 50 determines that the room temperature "Tr" is equal to or higher than the battery temperature "Tb" (YES at the step S111), the process goes to a step S112. On the other hand, when the computer 50 determines that the room temperature "Tr" is lower than the battery temperature "Tb" (NO at the step S111), the process goes to a step S113.

At the step S112, the battery blower device 16 is turned on. At the step S113, the battery blower device 16 is turned off, because the battery temperature "Tb" may be decreased when the battery blower device 16 is turned on in the condition that the room temperature "Tr" is lower than the battery temperature "Tb".

Figure 2:
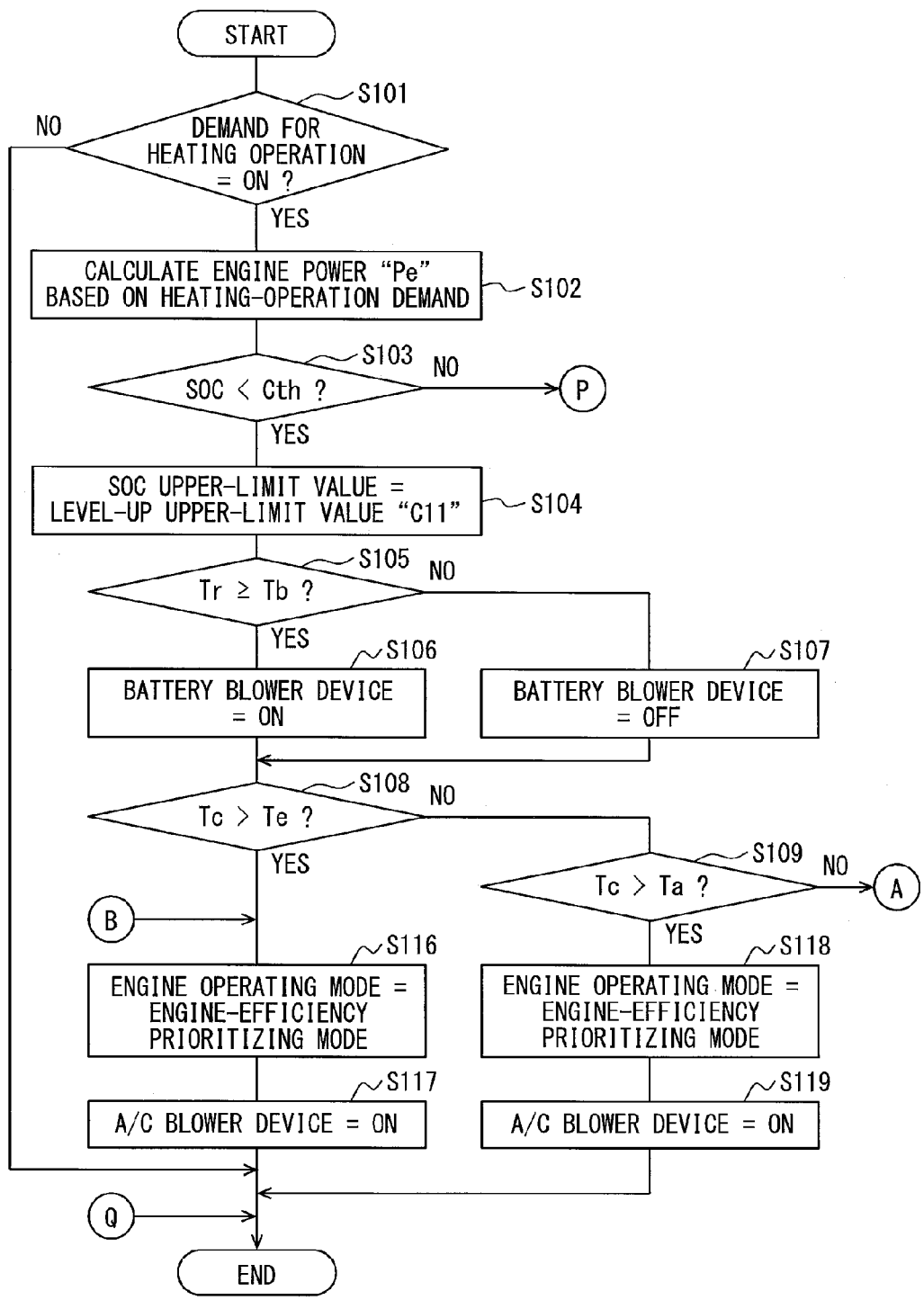
FIG. 2 is a part of a flow-chart showing a control process of a warm-up operation for the vehicle control system of the first embodiment.

As above, the process of the steps 111 to S113 of FIG. 3 is identical to that of the steps S105 to S107 of FIG. 2.

At a step S114, which is executed after the step S112 or S113, the computer 50 determines whether the cooling water temperature "Tc" is higher than the warm-up threshold value "Te", like the step S108 of FIG. 2. When the computer determines that the cooling water temperature "Tc" is higher than the warm-up threshold value "Te" (YES at the step S114), the process goes to the step S116 of FIG. 2. On the other hand, when the computer determines that the cooling water temperature "Tc" is lower than (or equal to) the warm-up threshold value "Te" (NO at the step S114), the process goes to a step S115.

The step S115 is identical to the step S109 of FIG. 2. At the step S115, the computer 50 determines whether the cooling water temperature "Tc" is higher than the heating-operation threshold value "Ta". When the computer 50 determines that the cooling water temperature "Tc" is higher than the heating-operation threshold value "Ta" (YES at the step S115), the process goes to a step S120. On the other hand, when the computer 50 determines that the cooling water temperature "Tc" is lower than (or equal to) the heating-operation threshold value "Ta" (NO at the step S115), the process goes to the step S122.

When the computer 50 determines either at the step S108 of FIG. 2 or at the step S114 of FIG. 3 that the cooling water temperature "Tc" is higher than the warm-up threshold value "Te" (YES at the step S108 or S114), the process goes to the step S116 of FIG. 2, at which an engine combustion mode (an operating mode of the engine 10) is changed to an efficiency prioritizing mode.

At a step S117, the A/C blower device 31 is turned on.

As explained above, the process goes to the step S118, when the SOC value is smaller than the level-up allowing threshold "Cth" (YES at the step S103), when the cooling water temperature "Tc" is lower than (or equal to) the warm-up threshold value "Te" (NO at the step S108), and when the cooling water temperature "Tc" is higher than the heating-operation threshold value "Ta" (YES at the step S109). At the S118, the engine combustion mode (the engine operating mode) is also changed to the efficiency prioritizing mode.

At a step S119, the A/C blower device 31 is turned on, in the same manner to the step S117.

As is also explained above, the process goes to the step S120, when the SOC value is higher than the level-up allowing threshold "Cth" (NO at the step S103), when the cooling water temperature "Tc" is lower than the warm-up threshold value "Te" (NO at the step S114), and when the cooling water temperature "Tc" is higher than the heating-operation threshold value "Ta" (YES at the step S115). At the S120, the engine operating mode is changed to a waste-heat prioritizing mode.

At a step S121, the A/C blower device 31 is turned on.

The process goes to the step S122, when the cooling water temperature "Tc" is lower than the warm-up threshold value "Te" (NO at the step S114 of FIG. 3), and when the cooling water temperature "Tc" is lower than the heating-operation threshold value "Ta" (NO at the step S115 of FIG. 3). Alternatively, the process goes to the step S122, when the cooling water temperature "Tc" is likewise lower than the warm-up threshold value "Te" (NO at the step S108 of FIG. 2), and when the cooling water temperature "Tc" is lower than the heating-operation threshold value "Ta" (NO at the step S109 of FIG. 2). At the S122, the engine operating mode is also changed to the waste-heat prioritizing mode.

At a step S123, the A/C blower device 31 is turned off.

Figure 4:
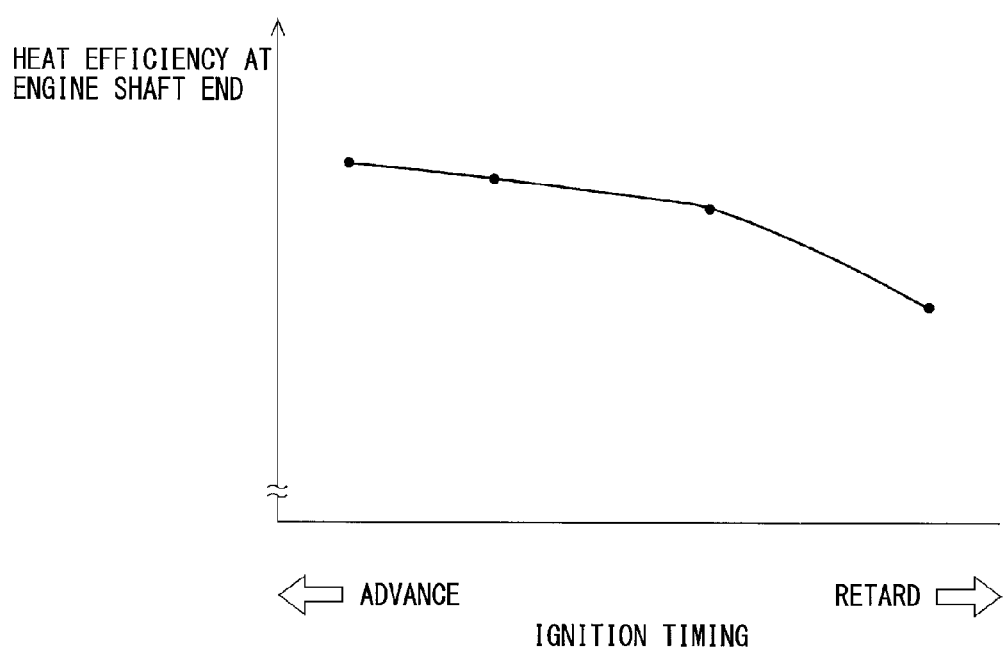
FIG. 4 is a graph showing engine operating condition of the first embodiment.

Now, the engine operating mode will be explained with reference to FIG. 4. As shown in FIG. 4, heat efficiency at a shaft end of the engine 10 (hereinafter, a shaft-end heat efficiency) is decreased, when an ignition timing for the engine 10 is retarded. Therefore, in the engine operation of the efficiency prioritizing mode, the igniting timing is so controlled (advanced) at such a timing which realizes the engine operation of the high shaft-end heat efficiency. On the other hand, in the engine operation of the waste-heat prioritizing mode, the ignition timing is retarded so that the shaft-end heat efficiency is decreased. In the waste-heat prioritizing mode, an amount of the waste heat from the engine 10 is increased. In other words, since a heat amount to be supplied to the engine cooling water is increased, it becomes possible to increase a temperature increasing speed of the cooling water temperature "Tc".

The control process for the warm-up operation not only for the engine 10 but also for the main battery 15 will be explained with reference to time-charts of FIGS. 5A to 5J. FIG. 5A shows the demand of the heating operation for the vehicle. FIG. 5B shows the upper limit of the SOC value. FIG. 5C shows the SOC value. FIG. 5D shows the amount of the generated electric power. FIG. 5E shows the cooling water temperature "Tc". FIG. 5F shows the battery temperature "Tb" and the room temperature "Tr". FIG. 5G shows the MG operating mode. FIG. 5H shows the engine operating mode. FIG. 5I shows a switching state (an ON-OFF state) of the A/C blower device 31. FIG. 5J shows a switching state (an ON-OFF state) of the battery blower device 16. As shown in FIG. 5A, the control process will be explained based on an assumption that there exists the demand for the heating operation (in the case of YES at the step S101).

In a period between t0 and t11 until the cooling water temperature "Tc" reaches the heating-operation threshold value "Ta", the engine operating mode is set to the waste-heat prioritizing mode (FIG. 5H), in order to rapidly increase the cooling water temperature "Tc", as shown in FIG. 5E. In addition, the A/C blower device 31 is turned off as shown in FIG. 5I, in order that cold air is not blown to the main battery 15. During the engine operation of the waste-heat prioritizing mode (t0-t11), the battery temperature "Tb" is gradually increased (FIG. 5F) by power-charging heat "Qc" generated by electric-power charging current "I" (not shown in the drawings).

When the cooling water temperature "Tc" reaches the heating-operation threshold value "Ta" at the timing t11, the A/C blower device 31 is turned on (FIG. 5I). Then, as shown by a dotted line in FIG. 5F, the room temperature "Tr" is increased. In addition, as shown in FIG. 5H, the engine operating mode is changed from the waste-heat prioritizing mode to the efficiency prioritizing mode. Then, as shown in FIG. 5E, an increasing speed of the cooling water temperature "Tc" becomes slower.

The battery blower device 16 is turned off, as shown in FIG. 5J, until the room temperature "Tr" reaches the battery temperature "Tb" at a timing t12 (FIG. 5F), in order that the cold air is not directly blown to the main battery 15. When the room temperature "Tr" reaches the battery temperature "Tb" at the timing t12, the battery blower device 16 is turned on, as shown in FIG. 5J.

When the battery blower device 16 is turned on, the battery temperature "Tb" is further increased by heat quantity "Qw" of blowing air from the battery blower device 16 in addition to the power-charging heat "Qc" generated by the electric-power charging current "I".

As shown in FIG. 5B, the SOC upper-limit value is set at the level-up upper-limit value "C11" during a period (t0-t13) until the SOC value reaches the level-up allowing threshold "Cth" at a timing t13, as shown in FIG. 5C. As shown in FIG. 5G, the MG 12 is operated in the level-up power generation mode during the period between t0 and t13. When the SOC value reaches the level-up allowing threshold "Cth" at the timing t13, as shown in FIG. 5C, the SOC upper-limit value is changed to the ordinary upper-limit value "C10", as shown in FIG. 5B. Then, as shown in FIG. 5G, the MG operating mode is changed to the ordinary power generation mode. Then, as shown in FIG. 5D, the power generation amount is decreased from a high power generation amount "Gi" of the level-up power generation mode to a low power generation amount "Gc" of the ordinary power generation mode. As a result, the increasing speed of the cooling water temperature "Tc" becomes smaller.

As above, FIGS. 5A to 5J show the example when the SOC value is smaller than the level-up allowing threshold "Cth", during the period from the timing t0 to the timing t13.

However, when the SOC value becomes larger than the level-up allowing threshold "Cth" during the above period from the timing t0 to the timing t13, the SOC upper-limit value is changed to the ordinary upper-limit value "C10", and the MG operating mode is changed to the ordinary power generation mode. As a result, the power generation amount is changed to the low power generation amount "Gc" of the ordinary power generation mode. In addition, the engine operating mode is changed to the waste-heat prioritizing mode, if the cooling water temperature "Tc" has not yet reached the warm-up threshold value "Te" during the period from t0 to t12.

Figure 6A:
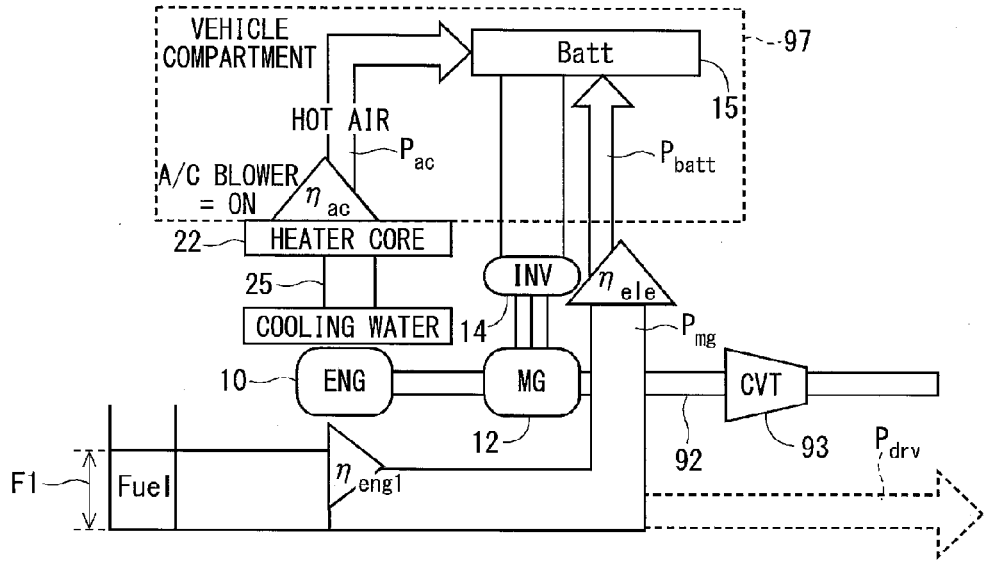
FIGS. 6A and 6B are views for explaining the control process of the warm-up operation when an SOC value is low.
Figure 6B:
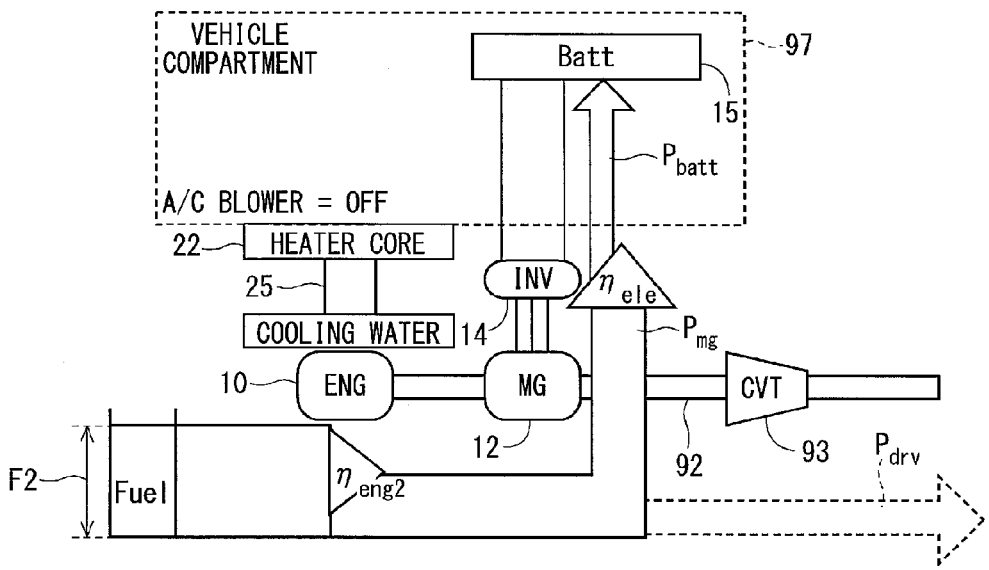
Figure 7A:
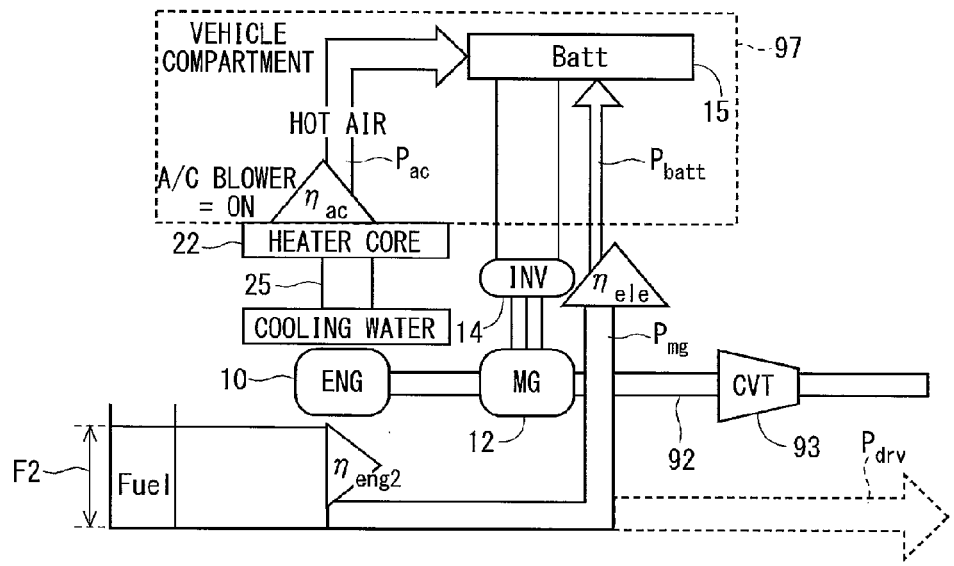
FIGS. 7A and 7B are views for explaining the control process of the warm-up operation when the SOC value is high.
Figure 7B:
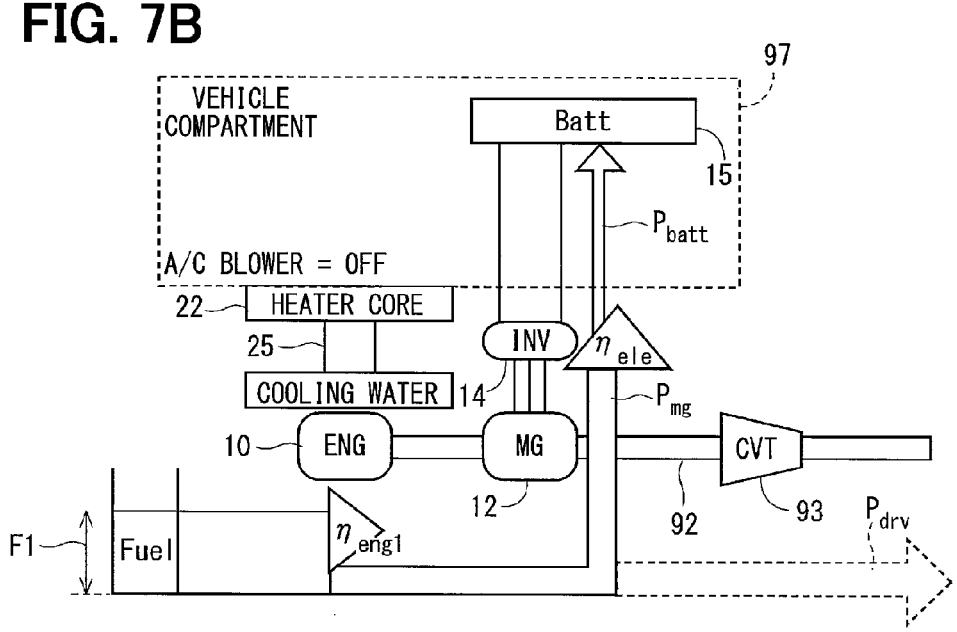

An increase of the battery temperature depending on a remaining charging capacity will be explained with reference to FIGS. 6A and 6B as well as FIGS. 7A and 7B. FIGS. 6A and 6B show the case, in which there is the remaining charging capacity, while FIGS. 7A and 7B show the case, in which there is no remaining charging capacity.

In each of FIGS. 6A, 6B, 7A and 7B, "$P_{mg}$" designates an MG driving power for the MG 12, "$P_{batt}$" designates generated electric power supplied to the main battery 15, "$P_{ac}$" designates an air-conditioner power (an A/C power) depending on the heat quantity "Qw" of the blowing air from the battery blower device 16 and the A/C blower device 31. "$\eta_{eng1}$" designates an engine efficiency when the engine 10 is operated in the efficiency prioritizing mode, "$\eta_{eng2}$" designates an engine efficiency when the engine 10 is operated in the waste-heat prioritizing mode, "$\eta_{ele}$" designates a power generation efficiency, which is a sum of efficiency of the MG 12 and efficiency of the inverter 14, and "$\eta_{ac}$" designates an air-conditioner efficiency (an A/C efficiency) which corresponds to an efficiency of the heating system 21.

"$P_{drv}$" designates a demanded driving power outputted at the drive shaft 92. However, in FIGS. 6A, 6B, 7A and 7B, the demanded driving power "$P_{drv}$" is regarded as zero for the purpose of simplifying the explanation.

As shown in FIG. 6A, when there is the remaining charging capacity, that is, when the SOC value is lower than the level-up allowing threshold "Cth", the generated electric power "$P_{batt}$" is large, because the MG 12 is operated in the level-up power generation mode. It is, therefore, possible to increase the battery temperature "Tb" by the power charging heat "Qc" of the generated electric power "$P_{batt}$".

In addition, the room temperature "Tr" is increased, because the A/C blower device 31 is turned on when the cooling water temperature "Tc" is higher than the heating-operation threshold value "Ta". When the room temperature "Tr" becomes higher than the battery temperature "Tb", battery blower device 16 is turned on. Accordingly, it becomes possible to increase the temperature of the main battery 15 by the heat quantity "Qw" of the blowing air from the battery blower device 16 and the A/C blower device 31.

According to the present embodiment, when the SOC value is lower than the level-up allowing threshold "Cth" and when the cooling water temperature "Tc" is higher than the heating-operation threshold value "Ta", the engine operating mode is changed not to the waste-heat prioritizing mode (shown in FIG. 6B) but to the efficiency prioritizing mode (shown in FIG. 6A).

As shown in FIG. 7A, when there is no remaining charging capacity, that is, when the SOC value is higher than the level-up allowing threshold "Cth", the generated electric power "$P_{batt}$" is small, because the MG 12 cannot be operated in the level-up power generation mode. As a result, the power charging heat "Qc" of the generated electric power "$P_{batt}$" is small and thereby a longer period is necessary for increasing the temperature of the main battery 15.

According to the present embodiment, therefore, the engine operating mode is changed to the waste-heat prioritizing mode in order to increase the heat amount supplied to the engine cooling water, when there is no remaining charging capacity. Then, it becomes possible to increase the increasing speed of the cooling water temperature "Tc". When the cooling water temperature "Tc" is rapidly increased, the timing for turning on the battery blower device 16 and the A/C blower device 31 is advanced. As a result, it becomes also possible to increase the temperature of the main battery 15 by the heat quantity "Qw" of the blowing air from the battery blower device 16 and the A/C blower device 31. As above, according to the present embodiment, the engine operating mode is changed to the waste-heat prioritizing mode when there is no remaining charging capacity, and the temperature of the main battery 15 is increased via the heating operation of the heating system 21.

In the present embodiment, when the SOC value is higher than the level-up allowing threshold "Cth", the priority is placed on the increase of the cooling water temperature "Tc" by use of the waste heat. Namely, the engine operating mode is changed not to the efficiency prioritizing mode (shown in FIG. 7B) but to the waste-heat prioritizing mode (shown in FIG. 7A).

A fuel consuming amount "F1" in the case of the efficiency prioritizing mode is smaller than a fuel consuming amount "F2" in the case of the waste-heat prioritizing mode, as shown in FIGS. 6A, 6B, 7A and 7B.

As explained above, the vehicle 90 (the hybrid vehicle) of the present embodiment has the engine 10, the MG 12, the main battery 15 and the heating system 21. The MG 12 is driven to rotate by the engine and generates the electric power. The main battery 15 receives the electric power from the MG 12 and supplies the electric power to the electric load 19 and other electrical devices. The heating system 21 operates by use of the waste heat of the engine 10.

The hybrid control device 50 (the computer 50) controls the vehicle 90 and carries out the following process.

The computer 50 determines whether there is the demand for the heating operation (the step S101 of FIG. 2). The computer 50 determines whether there is the remaining charging capacity or not based on the SOC value of the main battery 15 (the step S103 of FIG. 2). The computer 50 changes the upper limit of the SOC value depending the existence or non-existence of the remaining charging capacity. In addition, the computer 50 changes the engine operating mode.

According to the present embodiment, when the computer 50 determines that there is the demand for the heating operation (YES at the step S101 of FIG. 2) and that there is the remaining charging capacity in the main battery 15 (YES at the step S103), the SOC upper-limit value is changed to the level-up upper-limit value "C11" which is larger than the ordinary upper-limit value "C10" (the step S104). And the operating mode of the engine 10 is changed to the efficiency prioritizing mode (the steps S116 and S118).

On the other hand, when there is no remaining charging capacity (NO at the step S103), the SOC upper-limit value is maintained at the ordinary upper-limit value "C10" (the step S110 of FIG. 3) and the engine operating mode is changed to the waste-heat prioritizing mode (the steps S120 and S122), the efficiency of which lower than that of the efficiency prioritizing mode.

As explained above, in the present embodiment, when there is the remaining charging capacity for the main battery 15, the SOC upper-limit value is changed to the level-up upper-limit value "C11" and the operating mode of the MG 12 is thereby changed to the level-up power generation mode in order to increase the generated electric power. As a result, since the operating point of the engine 10 is moved to a high-load side, not only the efficiency of the engine 10 is improved but also the increasing speed of the cooling water temperature "Tc" becomes higher. In addition, since the charging electric power to the main battery 15 is increased depending on the increase of the generated electric power at the MG 12, it becomes possible to more effectively increase the temperature of the main battery 15 by the power charging heat "Qc".

On the other hand, when there is no remaining charging capacity for the main battery 15, it is not possible to increase the charging electric power to the main battery 15. Therefore, it takes a longer time period until each of the temperature of the engine cooling water and the temperature of the main battery 15 respectively reaches its target value. In the present embodiment, therefore, the operating mode of the engine 10 is changed to the waste-heat prioritizing mode when there is no remaining charging capacity for the main battery 15, in order to increase the heat amount to be supplied to the engine cooling water to thereby increase the increasing speed of the cooling water temperature "Tc". When the cooling water temperature "Tc" becomes higher, the increase of the room temperature "Tr" by the heating system 21 is facilitated. In addition, when the room temperature "Tr" becomes higher, it becomes possible to increase the battery temperature "Tb" by the blowing air from the battery blower device 16. As above, even when there is no remaining charging capacity for the main battery 15, it is possible to rapidly warm up the engine 10 and the main battery 15.

The hybrid control device 50 controls not only an ON-OFF operation of the A/C blower device 31 for blowing the air from the heater core 22 into the vehicle compartment 97 but also an ON-OFF operation of the battery blower device 16 for blowing the air toward the main battery 15 (the steps S106, S107, S117, S119, S112, S113, S121, S123).

When the room temperature "Tr" (the temperature of the vehicle compartment 97) is lower than the battery temperature "Tb" (the temperature of the main battery 15) (NO at the step S105), the battery blower device 16 is turned off (S107). As a result, it becomes possible to avoid the situation that the main battery 15 is winded to the cold air and thereby the increase of the temperature of the main battery 15 is prevented.

When the room temperature "Tr" is higher than the battery temperature "Tb" (YES at the step S105), the battery blower device 16 is turned on (S106). As a result, the temperature of the main battery 15 is increased by the air of the vehicle compartment 97 which is heated by the heater core 22.

When the cooling water temperature "Tc" (the temperature of the engine cooling water for the engine 10) is lower than the heating-operation threshold value "Ta" (NO at the S109 or NO at the step S115), the A/C blower device 31 is turned off. As a result, it becomes possible to avoid the situation that the cold air is blown into the vehicle compartment 97. On the other hand, when the cooling water temperature "Tc" is higher than the heating-operation threshold value "Ta" (YES at the S109 or YES at the step S115), the A/C blower device 31 is turned on. As a result, it becomes possible to properly heat the air in the vehicle compartment 97 by the heater core 22 of the heating system 21.

When the cooling water temperature "Tc" (the temperature of the engine cooling water for the engine 10) is lower than the heating-operation threshold value "Ta" (NO at the S109 or NO at the step S115), the engine operating mode is changed to the waste-heat prioritizing mode independently of the SOC value. As a result, it becomes possible to rapidly increase the cooling water temperature "Tc" to such a temperature ("Ta"), at which the heating operation can be carried out.

When the cooling water temperature "Tc" (the temperature of the engine cooling water for the engine 10) is higher than the warm-up threshold value "Te" (YES at the S108 or YES at the step S114), the engine operating mode is changed to the efficiency prioritizing mode independently of the SOC value. When the cooling water temperature "Tc" is sufficiently high, the fuel consumption ratio can be more improved by the engine operation of the efficiency prioritizing mode than the engine operation of the waste-heat prioritizing mode.

In the present embodiment, the hybrid control device 50 forms "a heating demand determining portion", "a charging capacity determining portion", "an upper-limit value setting portion", "an engine-mode setting portion" and "a blower control portion".

In FIGS. 2 and 3, the step S101 corresponds to a function of "the heating demand determining portion", the step S103 corresponds to a function of "the charging capacity determining portion", the steps S104 and S110 correspond to a function of "the upper-limit value setting portion", and the steps S116, S118, S120 and S122 correspond to a function of "the engine-mode setting portion". In addition, the steps S106, S107, S112, S113, S117, S119, S121 and S123 correspond to a function of "the blower control portion".

Second Embodiment

A second embodiment of the present disclosure will be explained with reference to FIGS. 8 and 9. The present embodiment is different from the first embodiment in the control process of the warm-up operation for the engine. Different portions are mainly explained hereinafter.

As explained in the first embodiment, when the operating mode of the engine 10 is changed to the waste-heat prioritizing mode, the increasing speed of the cooling water temperature "Tc" becomes larger, when compared with that of the engine operation in the efficiency prioritizing mode. In the present embodiment, therefore, the operating condition of the engine 10 is decided in view of a time period in which the battery temperature "Tb" reaches a target battery temperature "Tg".

The control process of the warm-up operation will be explained with reference to flow-charts of FIGS. 8 and 9. The steps S101 to S108, S110 to S114, S116 and S117 are identical to those of the first embodiment (FIGS. 2 and 3).

When the cooling water temperature "Tc" is lower than the warm-up threshold value "Te" (NO at the step S108 or NO at the step S114), the process goes to a step S130.

At the step 130 the hybrid control device 50 (the computer 50) calculates a first estimated time period "TP1" and a second estimated time period "TP2". The first estimated time period "TP1" is a time period, which is necessary for increasing the battery temperature "Tb" to the target battery temperature "Tg" when the engine 10 is operated in the efficiency prioritizing mode. The second estimated time period "TP2" is a time period, which is necessary for increasing the battery temperature "Tb" to the target battery temperature "Tg" when the engine 10 is operated in the waste-heat prioritizing mode.

At a step S131, the computer 50 determines whether a time difference "$\Delta$TP", which is a difference between the first estimated time period "TP1" and the second estimated time period "TP2" ("TP1">"TP2"), is larger than a time threshold value "$TP_{th}$". In other words, the computer 50 determines at the step S131 whether the battery temperature "Tb" reaches the target battery temperature "Tg" in the case of the waste-heat prioritizing mode at a timing earlier than that in the case of the efficiency prioritizing mode, by such a time period (the time difference "$\Delta$TP") larger than a predetermined value (the time threshold value "$TP_{th}$"). When the time difference "$\Delta$TP" is smaller than (or equal to) the threshold value "$TP_{th}$" (NO at the step S131), the process goes to a step S132. On the other hand, when the time difference "$\Delta$TP" is larger than the threshold value "$TP_{th}$" (YES at the step S131), the process goes to a step S133.

At the step S132, the operating mode of the engine 10 is changed to the efficiency prioritizing mode.

At the step S133, the operating mode of the engine 10 is changed to the waste-heat prioritizing mode.

At a step S134, which is carried out after the step S132 or S133, the computer 50 determines whether the cooling water temperature "Tc" is higher than the heating-operation threshold value "Ta". When the cooling water temperature "Tc" is higher than the heating-operation threshold value "Ta" (YES at the step S134), the process goes to a step S135. On the other hand, when the cooling water temperature "Tc" is lower than (or equal to) the heating-operation threshold value "Ta" (NO at the step S134), the process goes to a step S136.

At the step S135, the A/C blower device 31 is turned on, while at the step S136, the A/C blower device 31 is turned off.

As above, according to the present embodiment, when the cooling water temperature "Tc" is lower than (or equal to) the warm-up threshold value "Te", the engine operation in the waste-heat prioritizing mode and the engine operation in the efficiency prioritizing mode are compared with each other. And when the time period ("TP2") of the waste-heat prioritizing mode, in which the battery temperature "Tb" reaches the target battery temperature "Tg", is shorter by more than the time threshold value "$TP_{th}$" than that ("TP1") of the efficiency prioritizing mode, the operating mode of the engine 10 is changed to the waste-heat prioritizing mode.

A value for the time threshold value "$TP_{th}$" can be arbitrarily decided and it may be "zero".

A method for estimating the first and the second estimated time periods "TP1" and "TP2" will be explained.

As already explained in the first embodiment, the battery temperature "Tb" is increased by the heat quantity "Qw" of the blowing air from the battery blower device 16 in addition to the power-charging heat "Qc" generated by the electric-power charging current "I".

The power-charging heat "Qc" can be calculated by the following formula (1) based on the electric-power charging current "I" and an internal resistance "R" of the battery:

$$Qc = I^2 \times R \quad (1)$$

In addition, the heat quantity "Qw" of the blowing air can be decided based on a flow rate "Vw" and a temperature "Tw" of the blowing air. The temperature of the vehicle compartment 97, which is detected by the temperature sensor 98, can be regarded as the temperature "Tw" of the blowing air. In the case that the room temperature "Tr" is lower than the battery temperature "Tb" and the battery blower device 16 is turned off, the flow rate "Vw" of the blowing air is regarded as "zero".

The first estimated time period "TP1" is calculated based on the power-charging heat "Qc", the heat quantity "Qw" of the blowing air, a capacity "Q" of the main battery 15, the current battery temperature "Tb", and the target battery temperature "Tg", when the engine 10 is operated in the efficiency prioritizing mode.

And in a similar manner, the second estimated time period "TP2" is calculated based on the power-charging heat "Qc", the heat quantity "Qw" of the blowing air, the capacity "Q" of the main battery 15, the current battery temperature "Tb", and the target battery temperature "Tg", when the engine 10 is operated in the waste-heat prioritizing mode.

More exactly, each of the first and the second estimated time periods "TP1" and "TP" is calculated, for example, by the following way:

A speed of temperature increase is estimated based on the power-charging heat "Qc", the heat quantity "Qw" of the blowing air, and the capacity "Q" of the main battery;

A temperature difference "ΔTP" between the target battery temperature "Tg" and the current battery temperature "Tb" is calculated; and Each of the first and the second estimated time periods "TP1" and "TP" is calculated by dividing the above speed of the temperature increase by the temperature difference "ΔTP".

Figure 9:
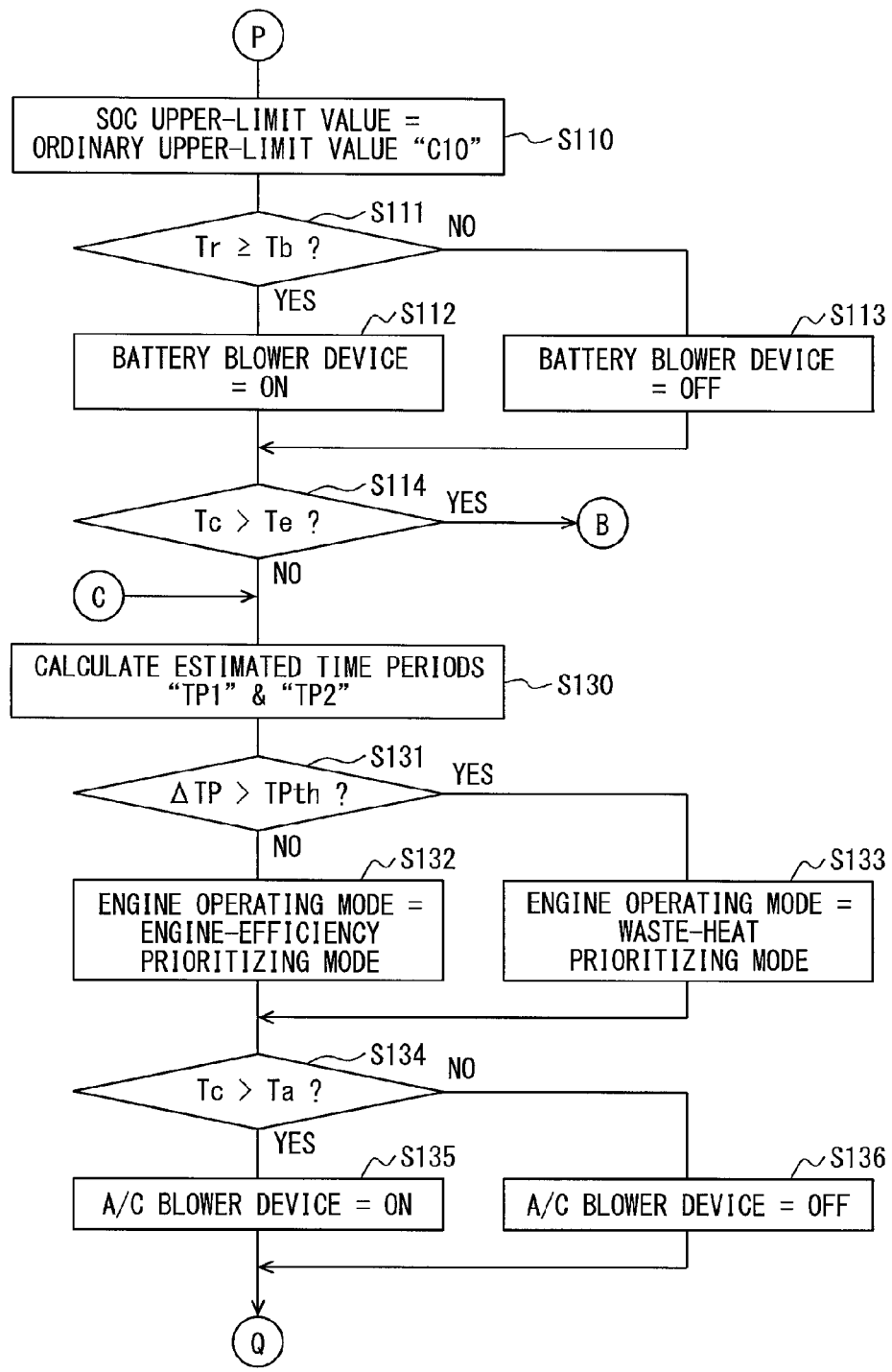
FIG. 9 is a remaining part of the flow-chart showing the control process of the warm-up operation of the second embodiment.

As explained above, the hybrid control device 50 (the computer 50) calculates the first and the second estimated time periods "TP1" and "TP2" (the step S130 of FIG. 9).

When the time difference "ΔTP" is smaller than (or equal to) the threshold value "TP$_{th}$" (NO at the step S131), the engine operating mode is changed to the efficiency prioritizing mode. On the other hand, when the time difference "ΔTP" is larger the threshold value "TP$_{th}$" (YES at the step S131), the engine operating mode is changed to the waste-heat prioritizing mode.

In the present embodiment, as explained above, when the computer 50 calculates the first and the second estimated time periods "TP1" and "TP2" and when the second time period "TP2" is shorter than the first time period "TP1" by more than the time threshold value "TP$_{th}$", the operating mode of the engine 10 is changed to the waste-heat prioritizing mode. As above, it is possible to decide the proper operating mode of the engine 10, which is preferable for rapidly increasing the battery temperature "Tb".

In addition, the present embodiment has the same advantages to those of the first embodiment.

In the present embodiment, the hybrid control device 50 further forms "an estimated-time calculating portion" in addition to the respective portions of the first embodiment.

Figure 8:
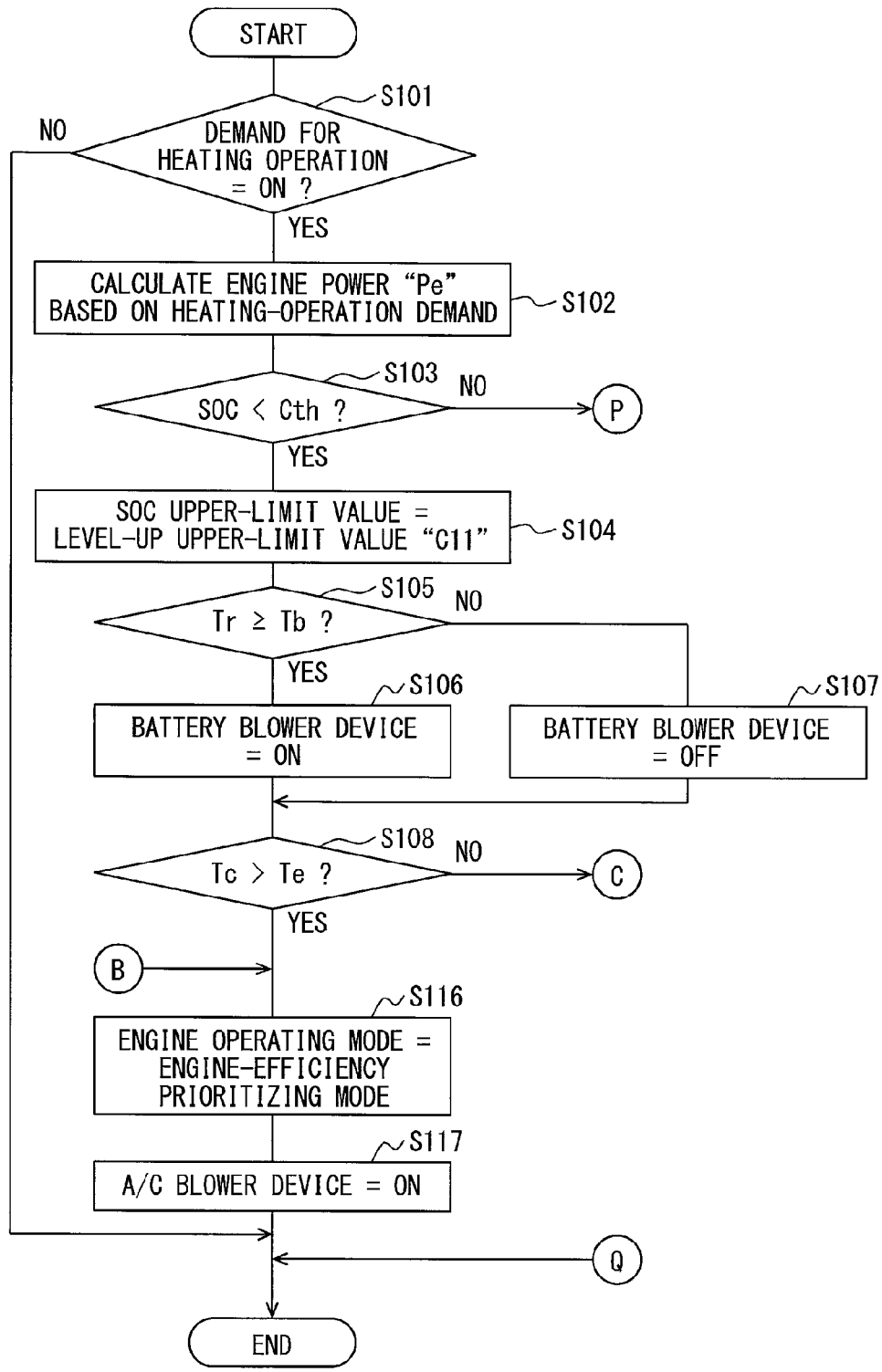
FIG. 8 is a part of a flow-chart showing a control process of a warm-up operation for the vehicle control system according to a second embodiment.

In FIGS. 8 and 9, the steps S116, S132 and S133 correspond to the function of "the engine-mode setting portion", the steps S106, S107, S112, S113, S117, S135 and S136 correspond to a function of "the blower control portion" and the step S130 corresponds to a function of "the estimated-time calculating portion". Each of "the heating demand determining portion", "the charging capacity determining portion" and "the upper-limit value setting portion" corresponds to the respective steps in FIGS. 8 and 9, in the same manner to the first embodiment.

Third Embodiment

A control process of the warm-up operation for the engine according to a third embodiment will be explained with reference to FIGS. 10 and 11.

As explained in the first embodiment, when the SOC value is higher than the level-up allowing threshold "Cth" and when the cooling water temperature "Tc" of the engine 10 is lower than the heating-operation threshold value "Ta", the operating mode of the engine 10 is changed to the waste-heat prioritizing mode in order that the temperature increase of the cooling water temperature "Tc" is facilitated and the battery temperature "Tb" of the main battery 15 is increased by means of the heating operation. In addition, as already explained, the efficiency of the engine 10 itself of the waste-heat prioritizing mode is lower than that of the efficiency prioritizing mode. Therefore, the fuel consuming amount of the engine 10 for the unit time in the waste-heat prioritizing mode is larger than that of the efficiency prioritizing mode. According to the present embodiment, therefore, the operating mode of the engine 10 is decided in view of the time period in which the battery temperature "Tb" reaches the target battery temperature "Tg".

Now, the control process of the warm-up operation of the third embodiment will be explained with reference to flow-charts of FIGS. 10 and 11.

The steps S101 to S108, S110 to S114, S116 and S117 are identical to those of the first embodiment (FIGS. 2 and 3).

Figure 11:
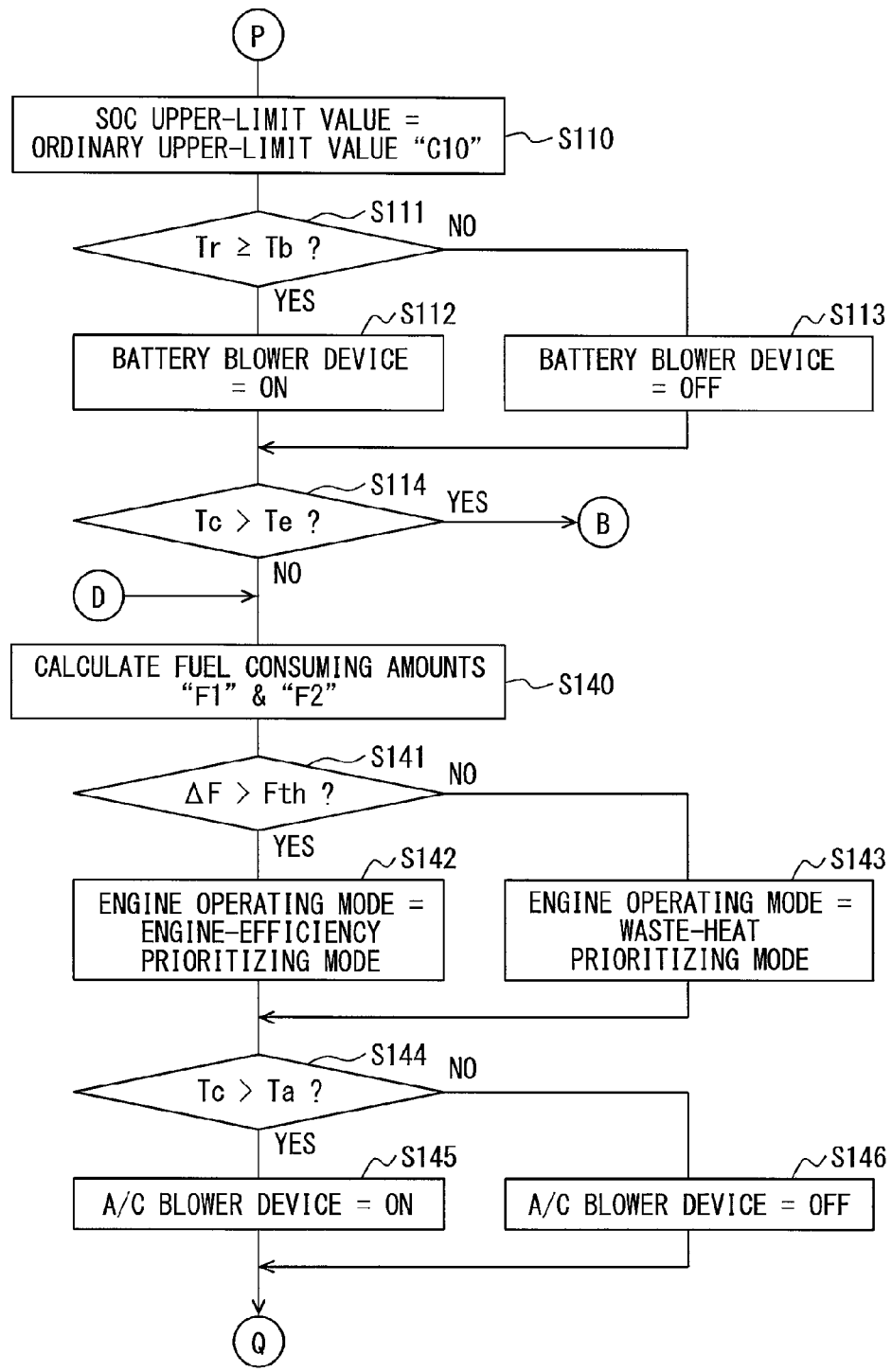
FIG. 11 is a remaining part of the flow-chart showing the control process of the warm-up operation of the third embodiment.

When the cooling water temperature "Tc" is lower than the warm-up threshold value "Te" (NO at the step S108 or NO at the step S114), the process goes to a step S140 of FIG. 11.

At the step 140 the hybrid control device 50 (the computer 50) calculates a first fuel consuming amount "F1" and a second fuel consuming amount "F2". The first fuel consuming amount "F1" corresponds to such a fuel amount, which is necessary for increasing the battery temperature "Tb" to the target battery temperature "Tg" when the engine 10 is operated in the efficiency prioritizing mode. The second fuel consuming amount "F2" corresponds to such a fuel amount, which is necessary for increasing the battery temperature "Tb" to the target battery temperature "Tg" when the engine 10 is operated in the waste-heat prioritizing mode.

At a step S141, the computer 50 determines whether a fuel amount difference "ΔF", which is a difference between the first fuel consuming amount "F1" and the second fuel consuming amount "F2" ("F1">"F2"), is larger than a fuel amount threshold value "Fth". When the fuel amount difference "ΔF" is larger than the fuel amount threshold value "Fth" (YES at the step S141), the process goes to a step S142. On the other hand, when the fuel amount difference "ΔF" is smaller than (or equal to) the fuel amount threshold value "Fth" (NO at the step S141), the process goes to a step S143. A value for the fuel amount threshold value "Fth" can be arbitrarily decided and it may be "zero".

At the step S142, the operating mode of the engine 10 is changed to the efficiency prioritizing mode.

At the step S143, the operating mode of the engine 10 is changed to the waste-heat prioritizing mode.

At a step S144, which is carried out after the step S142 or S143, the computer 50 determines whether the cooling water temperature "Tc" is larger than the heating-operation threshold value "Ta". When the cooling water temperature "Tc" is larger than the heating-operation threshold value "Ta" (YES at the step S144), the process goes to a step S145. On the other hand, when the cooling water temperature "Tc" is smaller than (or equal to) the heating-operation threshold value "Ta" (NO at the step S144), the process goes to a step S146.

At the step S145, the A/C blower device 31 is turned on, while at the step S146, the A/C blower device 31 is turned off.

The above steps S144 to S146 are identical to the steps S134 to S136 of the second embodiment (FIG. 9).

A method for calculating the first and the second fuel consuming amounts "F1" and "F2" will be explained with reference to FIGS. 7A and 7B. FIGS. 7A and 7B show the example in the case that the SOC value is larger than the level-up allowing threshold "Cth". However, the method for calculating the first and the second fuel consuming amounts "F1" and "F2" in the case that the SOC value is smaller than the level-up allowing threshold "Cth" is the same to that in the case that the SOC value is larger than the level-up allowing threshold "Cth".

In the example of FIG. 7A, it is assumed that the battery blower device 16 and the A/C blower device 31 are turned on, because the engine 10 is operated in the waste-heat prioritizing mode and thereby the cooling water temperature "Tc" is rapidly increased. On the other hand, in the example of FIG. 7B, it is assumed that the battery blower device 16 and the A/C blower device 31 are turned off, because the engine 10 is operated in the efficiency prioritizing mode and thereby the cooling water temperature "Tc" is slowly increased.

A case, in which the engine 10 is operated in the waste-heat prioritizing mode and the battery blower device 16 as well as the A/C blower device 31 is turned on, will be explained with reference to FIG. 7A.

A temperature difference "ΔT2" between the target battery temperature "Tg" and the current battery temperature "Tb" in the case of the waste-heat prioritizing mode is in proportion to a sum of the generated electric power "$P_{batt}$" and the A/C power "$P_{ac}$", as indicated by the following formula (2):

$$\text{"}\Delta T2\text{"} \propto \text{"}P_{batt}\text{"} + \text{"}P_{ac}\text{"} \quad (2)$$

The generated electric power "$P_{batt}$" is calculated by the following formula (3), based on the MG driving power "$P_{mg}$" for the MG 12 and the power generation efficiency "$\eta_{ele}$". In the following formula (3), "$\eta_{ele}(P_x)$" corresponds to the power generation efficiency, when the MG 12 is operated by a power "$P_x$". A map is prepared in advance for "$\eta_{ele}(P_x)$", so that "$\eta_{ele}(P_x)$" is calculated based on the MG driving power "$P_{mg}$".

$$\text{"}P_{batt}\text{"} = \text{"}P_{mg}\text{"} \times \text{"}\eta_{ele}(P_x)\text{"} \quad (3)$$

The second fuel consuming amount "F2", which corresponds to the fuel consuming amount in the case that the MG driving power "$P_{mg}$" is outputted by the operation of the engine 10 by the waste-heat prioritizing mode, is calculated by the following formula (4):

$$\text{"}F2\text{"} = \text{"}P_{mg}\text{"} / \text{"}\eta_{eng2}(P_{mg})\text{"} \quad (4)$$

In the above formula (4), "$\eta_{eng2}(P_y)$" corresponds to the engine efficiency, when the power "$P_y$" is outputted from the engine 10 in the engine operation of the waste-heat prioritizing mode. A map is prepared in advance for "$\eta_{eng2}(P_y)$", so that "$\eta_{eng2}(P_y)$" is calculated based on the MG driving power "$P_{mg}$".

A case, in which the engine is operated in the efficiency prioritizing mode and the battery blower device 16 as well as the A/C blower device 31 is turned off, will be explained with reference to FIG. 7B.

A temperature difference "ΔT1" between the target battery temperature "Tg" and the current battery temperature "Tb" in the case of the efficiency prioritizing mode is in proportion to the generated electric power "$P_{batt}$", as indicated by the following formula (5):

$$\text{"}\Delta T1\text{"} \propto \text{"}P_{batt}\text{"} \quad (5)$$

The generated electric power "$P_{batt}$" is calculated by the formula (3), as explained above.

The first fuel consuming amount "F1", which corresponds to the fuel consuming amount in the case that the MG driving power "$P_{mg}$" is outputted by the operation of the engine 10 by the efficiency prioritizing mode, is calculated by the following formula (6):

$$\text{"}F1\text{"} = \text{"}P_{mg}\text{"} / \text{"}\eta_{eng1}(P_{mg})\text{"} \quad (6)$$

In the above formula (6), "$\eta_{eng1}(P_z)$" corresponds to the engine efficiency, when the power "$P_z$" is outputted from the engine 10 in the engine operation of the efficiency prioritizing mode. A map is prepared in advance for "$\eta_{eng1}(P_z)$", so that "$\eta_{eng1}(P_z)$" is calculated based on the MG driving power "$P_{mg}$".

Then, the computer 50 calculates such first and second fuel consuming amounts "F1" and "F2", which satisfy "ΔT1=ΔT2", based on the above formulas (2) to (6).

As above, the hybrid control device 50 (the computer 50) calculates the first and the second fuel consuming amounts "F1" and "F2" (the step S140 of FIG. 11).

And when the fuel amount difference "ΔF" is larger than the fuel amount threshold value "Fth" (YES at the step S141), the operating mode of the engine 10 is changed to the efficiency prioritizing mode (the step S142). On the other hand, when the fuel amount difference "ΔF" is smaller than (or equal to) the fuel amount threshold value "Fth" (NO at the step S141), the operating mode of the engine 10 is changed to the waste-heat prioritizing mode (the step S143).

When the engine 10 is operated in the efficiency prioritizing mode, the time period during which the battery temperature "Tb" reaches the target battery temperature "Tg" usually becomes longer than that of the engine operation in the waste-heat prioritizing mode. However, on the other hand, when the engine 10 is operated in the efficiency prioritizing mode, the fuel consuming amount (which is necessary for increasing the battery temperature "Tb" to the target battery temperature "Tg") may become smaller than that of the engine operation in the waste-heat prioritizing mode.

According to the present embodiment, therefore, in view of the fuel consuming amount, the operating mode of the engine 10 is changed to the efficiency prioritizing mode, when the fuel amount difference "ΔF" is larger than the fuel amount threshold value "Fth". As a result, it becomes possible to improve the fuel consumption ratio.

In addition, the present embodiment can realize the same advantages to those of the above embodiments.

In the present embodiment, the hybrid control device 50 further forms "a fuel amount calculating portion" in addition to the respective portions of the first embodiment.

Figure 10:
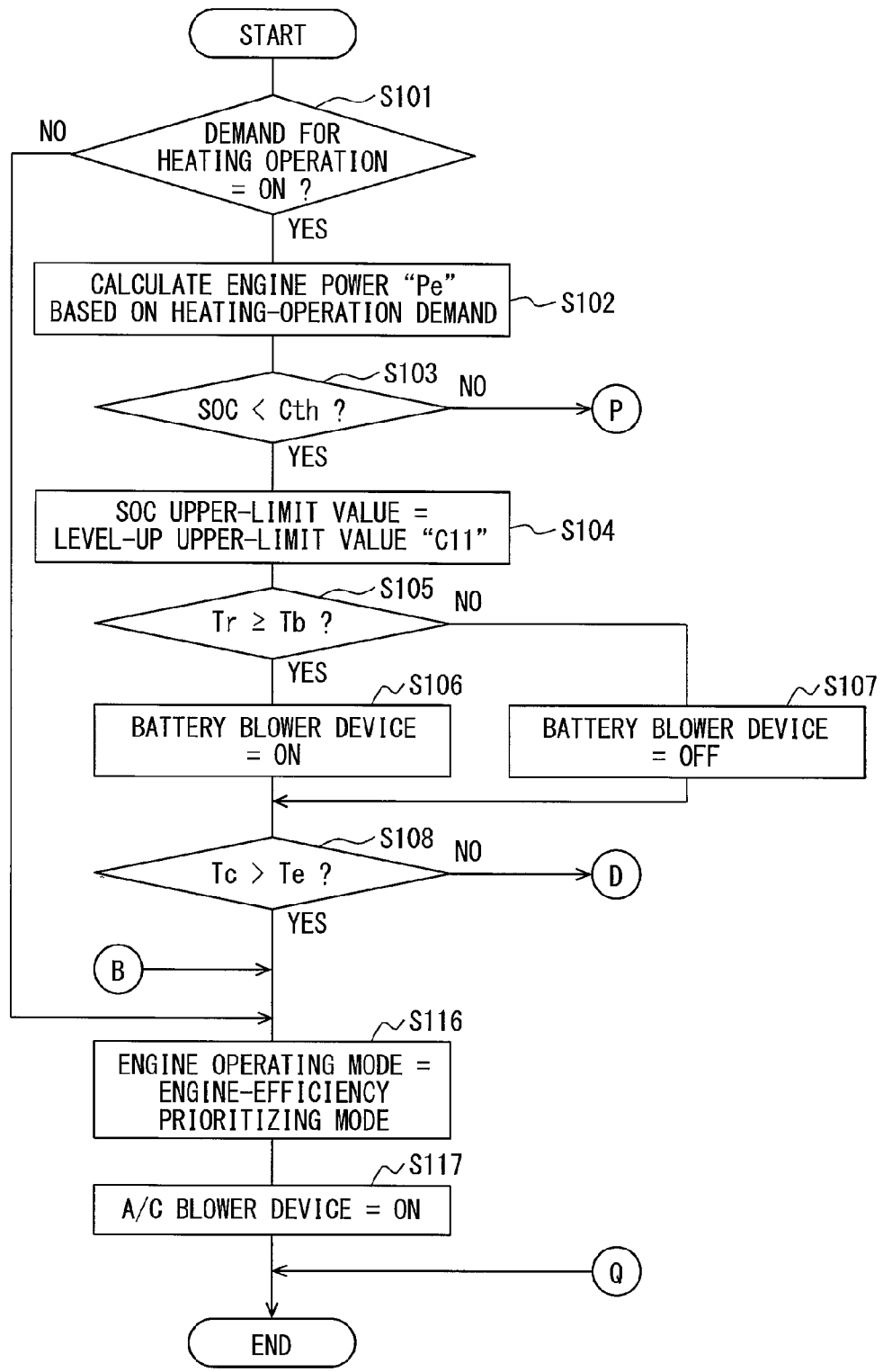
FIG. 10 is a part of a flow-chart showing a control process of a warm-up operation for the vehicle control system according to a third embodiment.

In FIGS. 10 and 11, the steps S116, S142 and S143 correspond to the function of "the engine-mode setting portion", the steps S106, S107, S112, S113, S117, S145 and S146 correspond to the function of "the blower control portion" and the step S140 corresponds to a function of "the fuel amount calculating portion". Each of "the heating demand determining portion", "the charging capacity determining portion" and "the upper-limit value setting portion" corresponds to the respective steps in FIGS. 10 and 11, in the same manner to the first embodiment.

Fourth Embodiment

Figure 12:
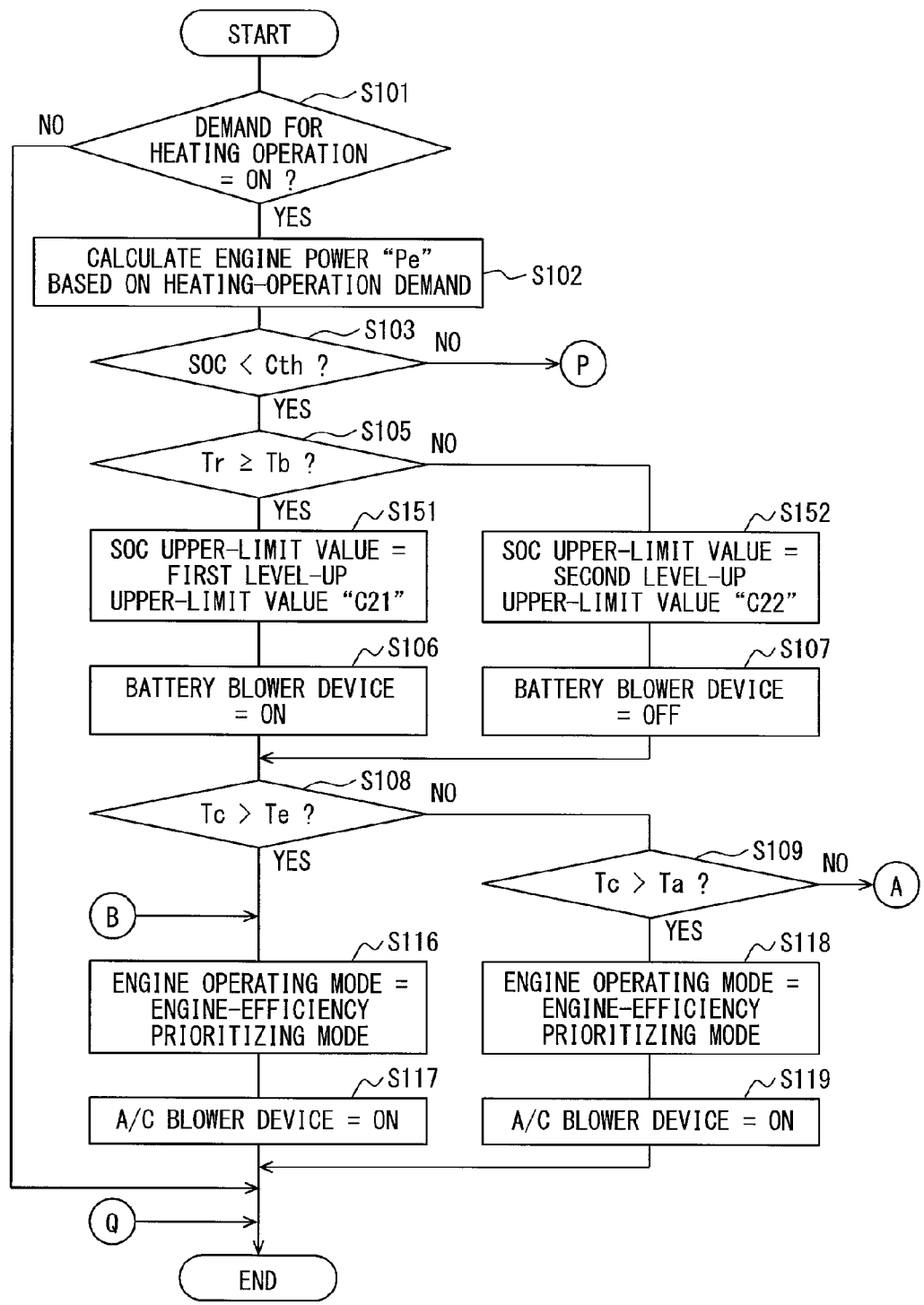
FIG. 12 is a flow-chart showing a control process of a warm-up operation for the vehicle control system according to a fourth embodiment.

A fourth embodiment of the present disclosure is shown in FIG. 12, which is a modification of the flow-chart of FIG. 2. A flow-chart, which is the same to that of FIG. 3, is applied to the flow-chart of FIG. 12.

In the present embodiment (the flow-chart of FIG. 12), a step corresponding to the step S104 of FIG. 2 is eliminated. Instead, steps S151 and S152 are added, which are executed after the step S105. The steps S151 and S152 are mainly explained hereinafter.

The process goes to the step S151, when the SOC is smaller than the level-up allowing threshold "Cth" (YES at the step S103) and the room temperature "Tr" is higher than (or equal to) the battery temperature "Tb" (YES at the step S105). At the step S151, the computer 50 sets the SOC upper-limit value at a first level-up upper-limit value "C21" and the process goes to the step S106. The first level-up upper-limit value "C21" is set at such a value, which is higher than the ordinary upper-limit value "C10". The first level-up upper-limit value "C21" may be set at such a value, which is equal to the level-up upper-limit value "C11" or which is different from the level-up upper-limit value "C11".

The process goes to the step S152, when the SOC is smaller than the level-up allowing threshold "Cth" (YES at the step S103) and the battery temperature "Tb" is higher than the room temperature "Tr" (NO at the step S105). At the step S152, the computer 50 sets the SOC upper-limit value at a second level-up upper-limit value "C22", which is higher than the first level-up upper-limit value "C21". And the process goes to the step S107.

As above, according to the present embodiment, the computer 50 sets (at the step S151) the SOC upper-limit value at the first level-up upper-limit value "C21" (which is higher than the ordinary upper-limit value "C10"), when there is the remaining charging capacity in the main battery 15 (YES at the step S103) and when the room temperature "Tr" (which is equal to the temperature of the vehicle compartment 97) is higher than or equal to the battery temperature "Tb" of the main battery 15 (YES at the step S105). In addition, the computer 50 sets (at the step S152) the SOC upper-limit value at the second level-up upper-limit value "C22" (which is higher than the first level-up upper-limit value "C21"), when there is the remaining charging capacity in the main battery 15 (YES at the step S103) and when the battery temperature "Tb" is higher than the room temperature "Tr" (NO at the step S105). Accordingly, the computer 50 sets the SOC upper-limit value in two steps in order to further increase the generated electric power, when the temperature of the main battery 15 is high and a performance for charging the electric power is high.

The performance of the main battery 15 for charging the electric power can be regarded as being high, when the SOC value is lower than the level-up allowing threshold "Cth" and the battery temperature "Tb" is higher than the room temperature "Tr". When the room temperature "Tr" is low, it is necessary to assure a performance of the heating operation. In the present embodiment, therefore, the SOC upper-limit value is set at the second level-up upper-limit value "C22" (which is higher than the first level-up upper-limit value "C21"), when the SOC value is lower than the level-up allowing threshold "Cth" and the battery temperature "Tb" is higher than the room temperature "Tr". As a result, the charging amount of the electric power to the main battery 15 can be further increased and thereby it becomes possible to rapidly increase the temperature of the main battery 15. In other words, it becomes possible to complete the warm-up operation for the battery in a shorter period.

In addition, the same advantages to those of the above embodiments can be obtained in the present embodiment.

In the present embodiment, the steps S151 and S152 of FIG. 12 correspond to the function of "the upper-limit value setting portion" in place of the step S104 of the first embodiment. Each of the other portions corresponds to the respective steps in FIG. 12, in the same manner to the first embodiment.

The steps following the step S106 in FIG. 12 may be replaced by those corresponding steps of the second or the third embodiment.

Fifth Embodiment

A fifth embodiment of the present disclosure is shown in FIG.

13, which is a modification of the flow-chart of FIG. 2. A flow-chart, which is the same to that of FIG. 3, is also applied to the flow-chart of FIG. 13.

In the present embodiment (the flow-chart of FIG. 13), a step corresponding to the step S101 of FIG. 2 is eliminated. Instead, steps S201 to S205 are added. The steps S201 to S205 are mainly explained hereinafter.

At the step S201, the computer 50 determines whether the demanded driving power "$P_{drv}$" is smaller than a power threshold "Pth". The power threshold "Pth" is set at such a value, at which it is possible to stop the engine operation and to drive the vehicle by the MG 12 in the EV running mode. When the demanded driving power "$P_{drv}$" is larger than (or equal to) the power threshold "Pth" (NO at the step S201), the process goes to the step S204. On the other hand, when the demanded driving power "$P_{drv}$" is smaller than the power threshold "Pth" (YES at the step S201), the process goes to the step S202.

Figure 13:
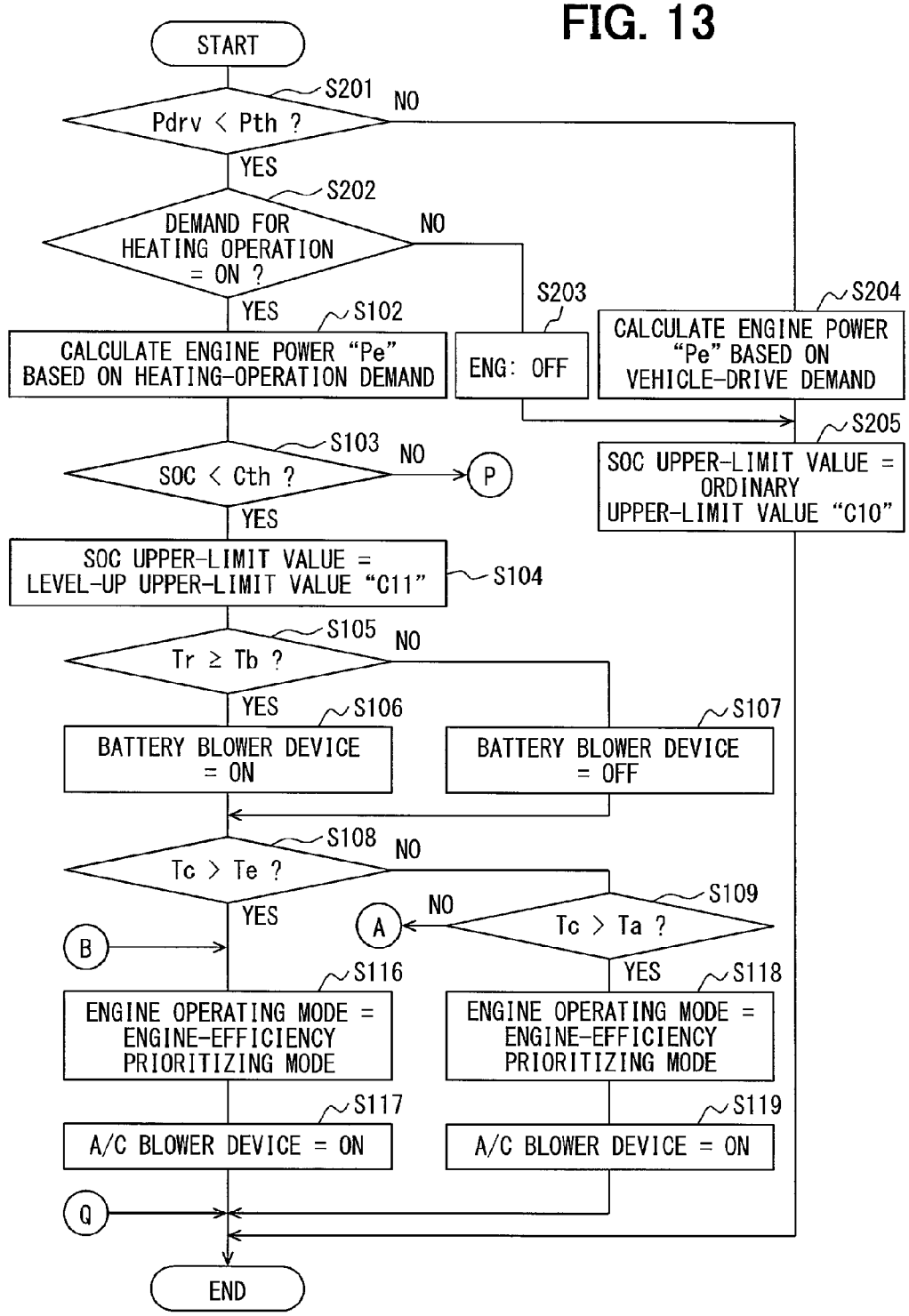
FIG. 13 is a flow-chart showing a control process of a warm-up operation for the vehicle control system according to a fifth embodiment.

At the step S202, the computer 50 determines whether there is the demand for the heating operating, like the step S101 of FIG. 2. When there is the demand for the heating operation, the process goes to the step S102. The steps (S103-S119) following the step S102 are identical to those of the first embodiment. Although FIG. 13 shows the steps following the step S102, which are identical to those of the first embodiment, the steps of the second, the third or the fourth embodiment maybe alternatively executed. When there is no demand for the heating operation (NO at the step S202), the process goes to the step S203.

At the step S203, the engine operation is stopped. At the step S204, which is executed when the demanded driving power "$P_{drv}$" is larger than (or equal to) the power threshold "Pth", the engine power "Pe" to be outputted from the engine 10 is decided based on the demanded driving power.

More exactly, the engine power "Pe" is decided based on the demanded driving power "$P_{drv}$", which is outputted to the drive shaft 92.

At the step S205, which is executed after the step S203 or the step S204, the SOC upper-limit value is set at the ordinary upper-limit value "C10". Then, the process goes to the end.

Even in the present embodiment, the same advantages to those of the above embodiments can be obtained.

In the present embodiment, the step S202 of FIG. 13 corresponds to the function of "the heating demand determining portion" in place of the step S101 of the first embodiment. Each of the other portions corresponds to the respective steps in FIG. 13, in the same manner to the first embodiment.

Further Embodiments and/or Modifications (M1) Estimated Time Period and Fuel Consuming Amount:

In the second embodiment, the operating mode of the engine is decided based on the first estimated time period "TP1" in the case of the efficiency prioritizing mode and the second estimated time period "TP2" in the case of the waste-heat prioritizing mode.

According to a modified embodiment, the first and the second estimated time periods "TP1" and "TP2" may be calculated by taking the on-off operation of the A/C blower device into consideration and the on-off operation of the A/C blower device may be controlled based on such estimated time periods. The battery blower device may be controlled in a similar manner.

In the third embodiment, the operating mode of the engine is decided based on the first fuel consuming amount "F1" in the case of the efficiency prioritizing mode and the second fuel consuming amount "F2" in the case of the waste-heat prioritizing mode.

According to a modified embodiment, the first and the second fuel consuming amounts "F1" and "F2" may be calculated by taking the on-off operation of the A/C blower device and the on-off operation of the A/C blower device may be controlled based on such fuel consuming amounts. The battery blower device may be also controlled in a similar manner.

In addition, the second embodiment and the third embodiment may be combined together. Namely, the operating mode of the engine may be decided based on the first estimated time period, the second estimated time period, the first fuel consuming amount and the second fuel consuming amount. For example, the steps S140 to S143 of FIG. 11 may be carried out instead of the step S133 of FIG. 9, so that the fuel consuming amounts are calculated when the difference between the first and the second estimated time periods is small and the operating mode of the engine is decided based on the fuel consuming amounts. Alternatively, the steps S130 to S133 of FIG. 9 are carried out instead of the step S143 of FIG. 11, so that the estimated time periods are calculated when the difference between the first and the second fuel consuming amounts is small and the operating mode of the engine is decided based on the estimated time periods.

In the second or the third embodiment, the operating mode of the engine is decided based on the estimated time periods or the fuel consuming amounts, when the cooling water temperature (Tc) is lower than the warm-up threshold value (Te).

According to a modified embodiment, the operating mode of the engine may be decided based on the estimated time periods or fuel consuming amounts, independently of the cooling water temperature.

Alternatively, the operating mode of the engine may be changed to the waste-heat prioritizing mode, when the cooling water temperature (Tc) is lower than the heating-operation threshold value (Ta). The operating mode of the engine may be changed to the efficiency prioritizing mode, when the cooling water temperature is higher than the warm-up threshold value. In addition, the operating mode of the engine may be decided based on the estimated time periods or the fuel consuming amounts, when the cooling water temperature is higher than the heating-operation threshold value but lower than the warm-up threshold value.

(M2) Blower Device:

In the above embodiments, the on-off operation of the battery blower device is controlled based on the battery temperature and the room temperature.

According to a modified embodiment, not only the on-off operation of the battery blower device but also the on-off operation of the A/C blower device may be respectively controlled based on the battery temperature and the room temperature.

In the above embodiments, the on-off operation of the A/C blower device is controlled based on the cooling water temperature.

According to a modified embodiment, not only the on-off operation of the A/C blower device but also the on-off operation of the battery blower device may be controlled based on the cooling water temperature.

As above, the battery blower device and the A/C blower device may be controlled in the same manner to each other. Alternatively, the on-off operation of the battery blower device and/or the A/C blower device may be controlled independently from the above warm-up operation.

In the first embodiment, the blower-operation threshold value for the on-off operation of the A/C blower device is the same value to the heating-operation threshold value for changing the operating mode of the engine. According to a modified embodiment, however, the blower-operation threshold value may be decided at a value different from the heating-operation threshold value.

(M3) Operating Mode of Engine:

In the waste-heat prioritizing mode of the above embodiments, the ignition timing is retarded when compared with that of the efficiency prioritizing mode. As a result, the shaft-end heat efficiency of the engine is made worse but the waste heat is instead increased. Then, the heat quantity supplied to the engine cooling water is increased, so that the warm-up operation of the engine is completed in the shorter period.

According to a modified embodiment, not only the ignition timing but also any other engine operating parameters may be changed, so long as the waste-heat amount in the waste-heat prioritizing mode is larger than that of the efficiency prioritizing mode. For example, in the efficiency prioritizing mode, the engine may be operated at such an operating point of a rotational speed and an engine torque, which can be obtained from an ideal fuel consumption line. On the other hand, in the waste-heat prioritizing mode, the operating point for the engine maybe changed to another point which has a rotational speed and an engine torque different from those of the ideal fuel consumption line but on an equal power line.

(M4) Control Device:

In the above embodiments, the hybrid control device, the power-source control device, the MG control device, the engine control device and the A/C control device are separately formed from each other.

According to a modified embodiment, the above multiple control devices may be formed in a single control device.

In addition, in the above embodiments, "the heating demand determining portion", "the charging capacity determining portion", "the upper-limit value setting portion", "the engine-mode setting portion", "the blower control portion", "the estimated-time calculating portion" and "the fuel amount calculating portion" are formed in the hybrid control device.

According to a modified embodiment, one of or all of the above portions may be formed in the control device other than the hybrid control device.

(M5) Vehicle Control System:

In the above embodiments, one motor-generator is provided in the vehicle. However, multiple motor-generators may be provided in the vehicle.

The motor-generator of the above embodiments is composed of the three-phase alternating current electric machine having the permanent magnets of the synchronous type. However, any kinds of the motor-generator may be used to the vehicle control system of the present disclosure.

Furthermore, the battery of the above embodiments is composed of the secondary battery. However, any other type of the battery, for example, an electric double layer capacitor, may be used for the vehicle control system of the present disclosure, so long as the electric power of the motor generator can be charged into the other type of the battery and the electric power can be discharged therefrom to the electric load.

As above, the present disclosure should not be limited to the above embodiments but can be modified in various manners without departing from a spirit of the present disclosure.

What is claimed is:

1. A vehicle control system for a hybrid vehicle comprising:
    an engine for producing a driving force for the hybrid vehicle;
    a motor-generator for generating electric power when the motor-generator is driven to rotate by the engine;
    an electric-power charging device connected to the motor-generator for charging the electric power generated at the motor-generator and for supplying the electric power to an electric load of an accessory device mounted to the hybrid vehicle;
    a heating system being operated by use of waste heat from the engine; and
    a vehicle control device for controlling a running condition of the hybrid vehicle,
    wherein the vehicle control device comprises;
    a heating demand determining portion for determining whether there is a demand for a heating operation of a vehicle compartment;
    a charging capacity determining portion for determining, based on a charging state of the electric-power charging device, whether there is a remaining charging capacity for the electric-power charging device;
    an upper-limit value setting portion for setting an upper limit value of the charging state of the electric-power charging device depending on an existence-nonexistence of the remaining charging capacity of the electric-power charging device; and
    an engine-mode setting portion for setting an operating mode of the engine,
    wherein, when the heating demand determining portion determines that there is the demand for the heating operation of the vehicle compartment and when the charging capacity determining portion determines that there is the remaining charging capacity for the electric-power charging device,
    (i) the upper-limit value setting portion sets the upper limit value of the charging state at a level-up upper-limit value, which is larger than an ordinary upper-limit value, and
    (ii) the engine-mode setting portion changes the operating mode of the engine to an engine-efficiency prioritizing mode, and
    wherein, when the heating demand determining portion determines that there is the demand for the heating operation of the vehicle compartment and when the charging capacity determining portion determines that there is no remaining charging capacity for the electric-power charging device,
    (iii) the upper-limit value setting portion sets the upper limit value of the charging state at the ordinary upper-limit value, and
    (iv) the engine-mode setting portion changes the operating mode of the engine to a waste-heat prioritizing mode, wherein an engine efficiency of the waste-heat prioritizing mode is lower than that of the engine-efficiency prioritizing mode.

2. The vehicle control system according to claim 1, further comprising;
    a blower control portion for controlling an on-off operation of an air-conditioner blower device for blowing air into the vehicle compartment and/or an on-off operation of a battery blower device for blowing air to the electric-power charging device.

3. The vehicle control system according to claim 2, wherein
    the blower control portion turns off the operation of the battery blower device, when a room temperature of the vehicle compartment is lower than a battery temperature of the electric-power charging device, and
    the blower control portion turns on the operation of the battery blower device, when the room temperature of the vehicle compartment is higher than the battery temperature of the electric-power charging device.

4. The vehicle control system according to claim 2, wherein
    the blower control portion turns off the operation of the air-conditioner blower device, when a cooling water temperature of engine cooling water is lower than a blower-operation threshold value, and
    the blower control portion turns on the operation of the air-conditioner blower device, when the cooling water temperature is higher than the blower-operation threshold value.

5. The vehicle control system according to claim 1, wherein
    the engine-mode setting portion changes the operating mode of the engine to the waste-heat prioritizing mode independently from the charging state of the electric-power charging device, when a cooling water temperature of engine cooling water is lower than a heating-operation threshold value.

6. The vehicle control system according to claim 1, wherein the engine-mode setting portion changes the operating mode of the engine to the engine-efficiency prioritizing mode independently from the charging state of the electric-power charging device, when a cooling water temperature of engine cooling water is higher than a warm-up threshold value.

7. The vehicle control system according to claim 1, further comprising;

an estimated-time calculating portion for calculating a first estimated time period and a second estimated time period, wherein the first estimated time period corresponds to such a period, which is necessary for a battery temperature of the electric-power charging device to reach a target battery temperature in the engine-efficiency prioritizing mode, wherein the second estimated time period corresponds to such a period, which is necessary for the battery temperature of the electric-power charging device to reach the target battery temperature in the waste-heat prioritizing mode, wherein the engine-mode setting portion changes the operating mode of the engine to the engine-efficiency prioritizing mode, when a time difference between the first estimated time period and the second estimated time period is smaller than a predetermined time threshold value, and wherein the engine-mode setting portion changes the operating mode of the engine to the waste-heat prioritizing mode, when the time difference is larger than the predetermined time threshold value.

8. The vehicle control system according to claim 1, further comprising;

a fuel amount calculating portion for calculating a first fuel consuming amount and a second fuel consuming amount, wherein the first fuel consuming amount corresponds to such a fuel amount, which is consumed by the engine until a battery temperature of the electric-power charging device reaches a target temperature value when the engine is operated in the engine-efficiency prioritizing mode, wherein the second fuel consuming amount corresponds to such a fuel amount, which is consumed by the engine until the battery temperature reaches the target temperature value when the engine is operated in the waste-heat prioritizing mode, wherein the engine-mode setting portion changes the operating mode of the engine to the engine-efficiency prioritizing mode, when a fuel amount difference between the first fuel consuming amount and the second fuel consuming amount is larger than a predetermined fuel amount threshold value, and wherein the engine-mode setting portion changes the operating mode of the engine to the waste-heat prioritizing mode, when the fuel amount difference is smaller than the predetermined fuel amount threshold value.

9. The vehicle control system according to claim 1, wherein the upper-limit value setting portion sets the upper limit value of the charging state at a first level-up upper-limit value, which is higher than an ordinary upper-limit value, when there is the remaining charging capacity for the electric-power charging device and when a room temperature of the vehicle compartment is higher than a battery temperature of the electric-power charging device, and the upper-limit value setting portion sets the upper limit value of the charging state at a second level-up upper-limit value, which is higher than the first level-up upper-limit value, when there is the remaining charging capacity for the electric-power charging device and when the battery temperature is higher than the room temperature.

\* \* \* \* \*